(12) United States Patent
Suwa et al.

(10) Patent No.: US 9,689,549 B2
(45) Date of Patent: Jun. 27, 2017

(54) VEHICLE HEADLIGHT DEVICE

(71) Applicant: MITSUBISHI ELECTRIC CORPORATION, Tokyo (JP)

(72) Inventors: Masashige Suwa, Tokyo (JP); Ritsuya Oshima, Tokyo (JP); Muneharu Kuwata, Tokyo (JP); Atsushi Michimori, Tokyo (JP); Kuniko Kojima, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 107 days.

(21) Appl. No.: 14/419,820

(22) PCT Filed: Sep. 3, 2013

(86) PCT No.: PCT/JP2013/005186
§ 371 (c)(1),
(2) Date: Feb. 5, 2015

(87) PCT Pub. No.: WO2014/038177
PCT Pub. Date: Mar. 13, 2014

(65) Prior Publication Data
US 2015/0204504 A1    Jul. 23, 2015

(30) Foreign Application Priority Data

Sep. 7, 2012 (JP) .................. 2012-197486
May 30, 2013 (JP) .................. 2013-114395

(51) Int. Cl.
*F21V 7/04* (2006.01)
*F21S 8/10* (2006.01)
*B62J 6/02* (2006.01)

(52) U.S. Cl.
CPC ............. *F21S 48/1757* (2013.01); *B62J 6/02* (2013.01); *F21S 48/1154* (2013.01);
(Continued)

(58) Field of Classification Search
CPC .. F21S 14/1154; F21S 48/125; F21S 48/1266; F21S 48/1283; F21S 48/1317;
(Continued)

(56) References Cited

U.S. PATENT DOCUMENTS 4,875,141 A    10/1989  Miyauchi et al.
4,922,390 A *   5/1990  Nakazawa ............. B60Q 1/115
                                                                362/282
(Continued)

FOREIGN PATENT DOCUMENTS

CN      102007340 A      4/2011
DE    102005037764 A1    2/2007
(Continued)

OTHER PUBLICATIONS

International Search Report issued in PCT/JP2013/005186, mailed on Dec. 10, 2013.

*Primary Examiner* — Peggy Neils
(74) *Attorney, Agent, or Firm* — Birch, Stewart, Kolasch & Birch, LLP

(57) ABSTRACT

A vehicle headlight device 100 includes a light source 11, a Dove prism 40, and a rotation mechanism 50. The light source 11 emits light. The Dove prism 40 changes a propagation direction of light received at an incidence surface 401 to bring the light to a reflecting surface 402, and changes a propagation direction of light reflected at the reflecting surface 402 to output the light from an exit surface 403. The rotation mechanism 50 rotatably supports the Dove prism 40 about a line which passes through the incidence surface 401 and the exit surface 403 as an axis of rotation R, and rotates the Dove prism 40 in a direction opposite to a bank direction of a vehicle body in accordance with a bank angle k of the vehicle body.

20 Claims, 20 Drawing Sheets

(52) U.S. Cl.
CPC ......... *F21S 48/125* (2013.01); *F21S 48/1266* (2013.01); *F21S 48/1283* (2013.01); *F21S 48/1317* (2013.01); *F21S 48/1388* (2013.01); *F21S 48/1721* (2013.01)

(58) Field of Classification Search
CPC .............. F21S 48/1388; F21S 48/1721; F21S 48/1757; F21S 48/1154; B62J 6/02; B62K 2207/02; B60Q 1/10; B60Q 1/11; B60Q 1/115
See application file for complete search history.

(56) References Cited

U.S. PATENT DOCUMENTS

| | | | |
|---|---|---|---|
| 7,244,055 B2* | 7/2007 | Kanzler | B60Q 1/12 362/476 |
| 7,511,440 B2 | 3/2009 | Goto et al. | |
| 7,762,699 B2* | 7/2010 | Reiners | B60Q 1/11 362/509 |
| 2003/0090908 A1 | 5/2003 | Taniuchi et al. | |
| 2005/0180158 A1 | 8/2005 | Komatsu | |
| 2008/0112174 A1* | 5/2008 | Nakano | B60Q 1/12 362/466 |
| 2011/0103085 A1 | 5/2011 | Kiel et al. | |
| 2011/0170308 A1* | 7/2011 | Kinoshita | B60Q 1/076 362/516 |
| 2012/0155102 A1* | 6/2012 | Melzner | F21V 5/002 362/510 |
| 2013/0148369 A1 | 6/2013 | Haest | |

FOREIGN PATENT DOCUMENTS

| | | |
|---|---|---|
| JP | 62-51101 A | 3/1987 |
| JP | 63-158701 A | 7/1988 |
| JP | 63-312280 A | 12/1988 |
| JP | 6-261242 A | 9/1994 |
| JP | 9-277974 A | 10/1997 |
| JP | 2001-347977 A | 12/2001 |
| JP | 2003-86009 A | 3/2003 |
| JP | 2003-141912 A | 5/2003 |
| JP | 2003-295319 A | 10/2003 |
| JP | 2005-228502 A | 8/2005 |
| JP | 2007-30803 A | 2/2007 |
| JP | 2007-333525 A | 12/2007 |
| JP | 2008-151642 A | 7/2008 |
| JP | 2010-122485 A | 6/2010 |
| JP | 2010-164855 A | 7/2010 |
| JP | 4523509 B2 | 8/2010 |
| JP | 4542231 B2 | 9/2010 |
| WO | WO 2012/022658 A1 | 2/2012 |

* cited by examiner

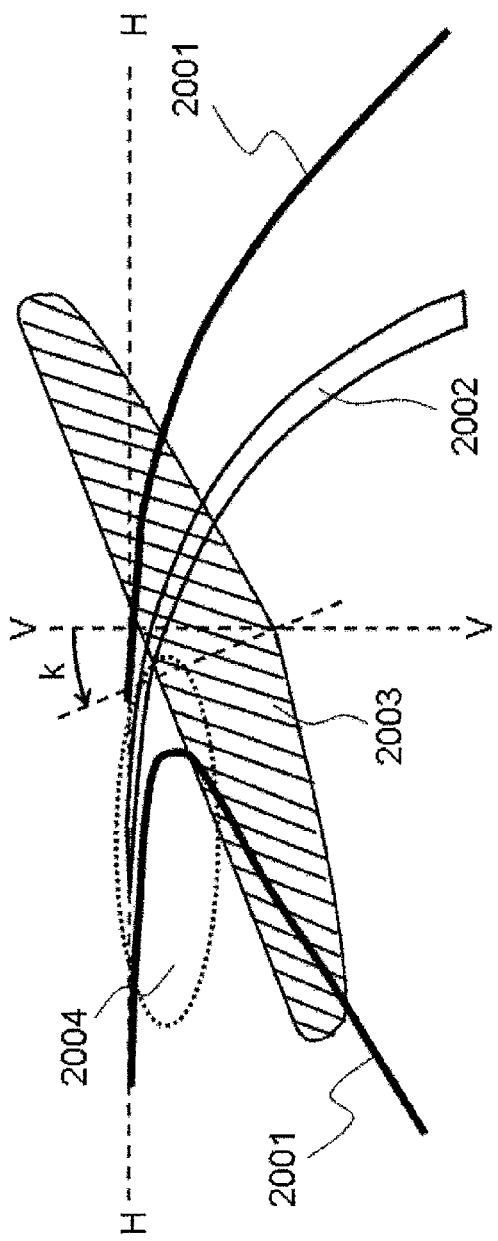
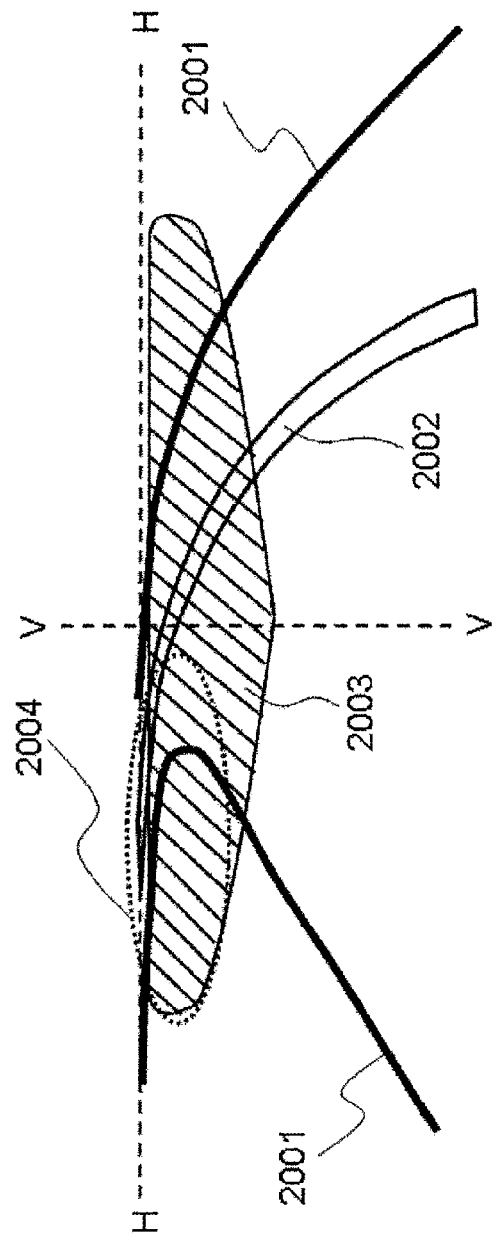
FIG. 8(A)
FIG. 8(B)

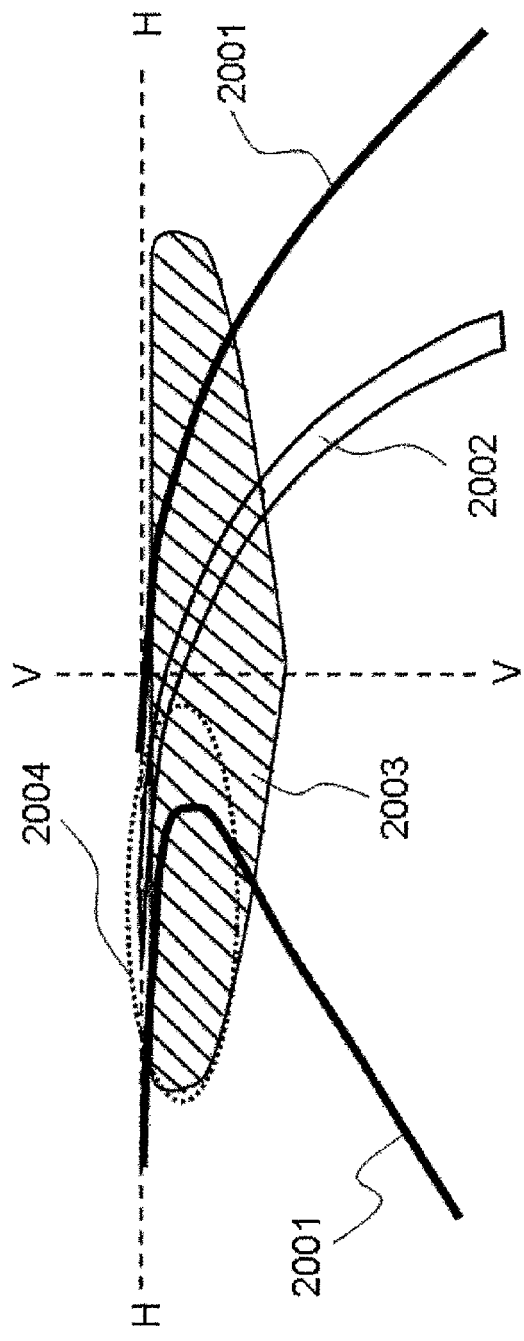
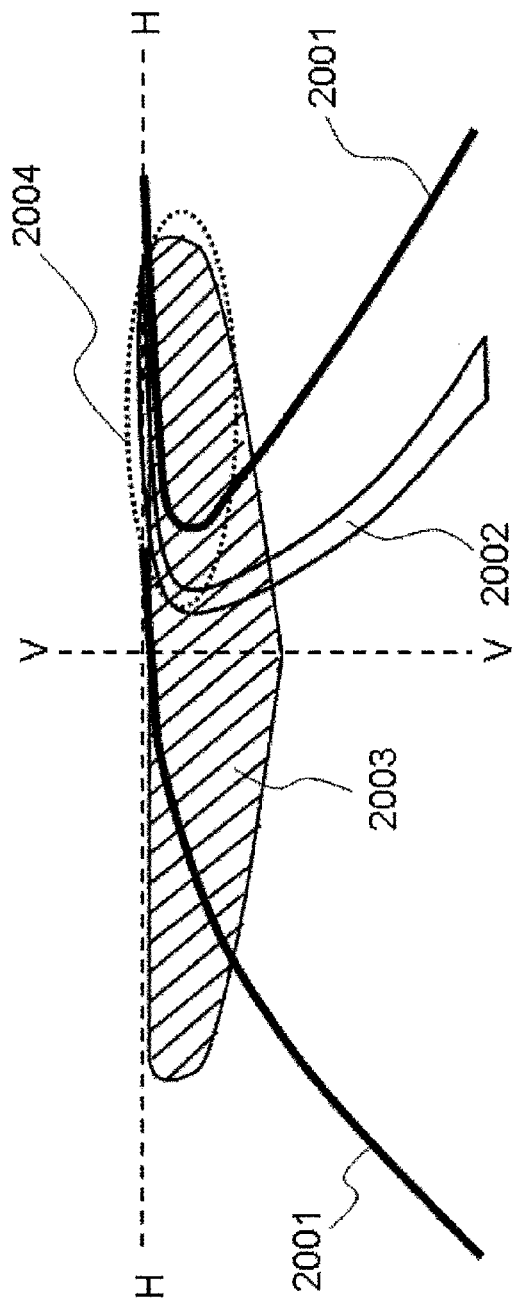
FIG. 9(A)
FIG. 9(B)

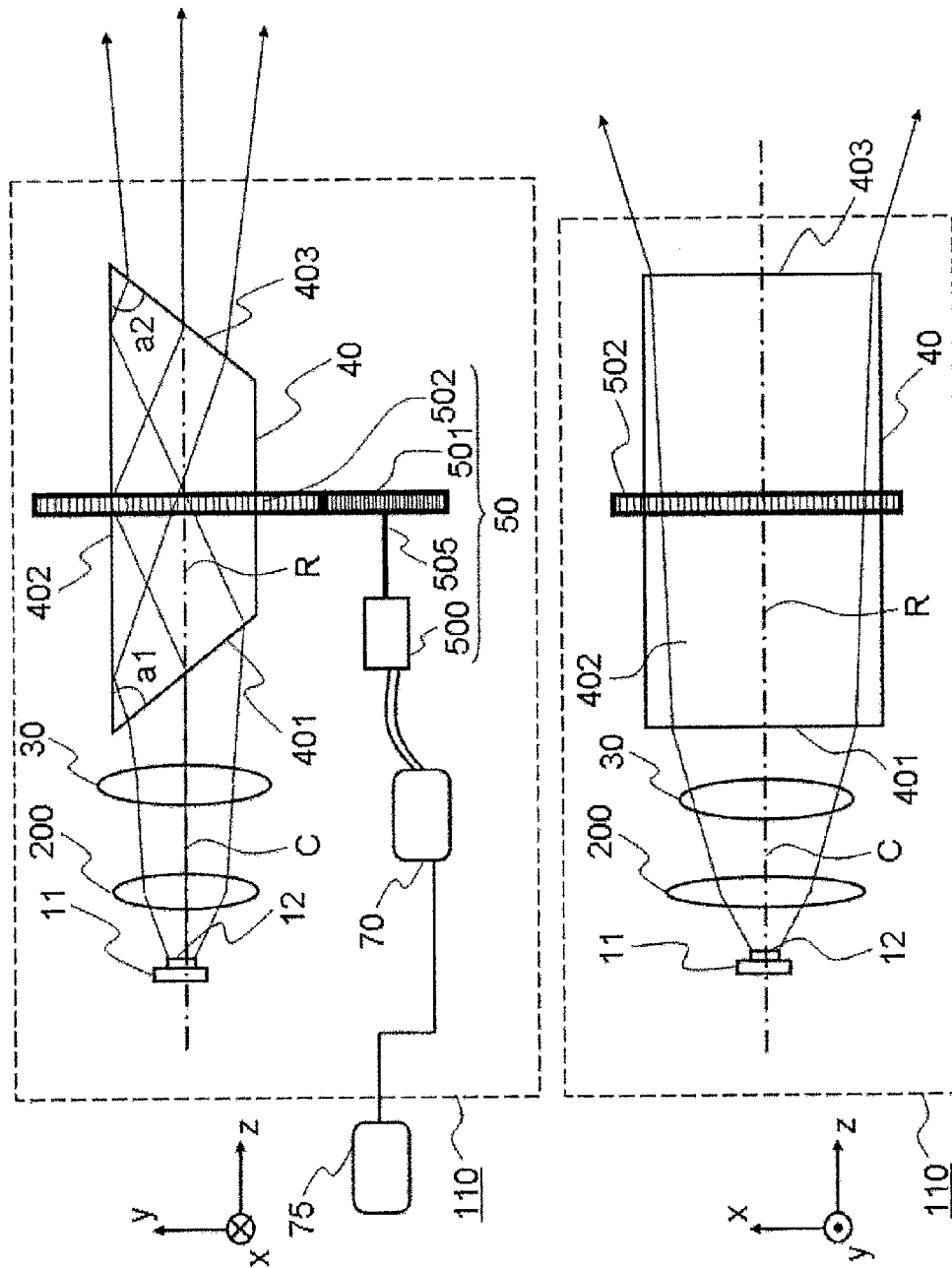

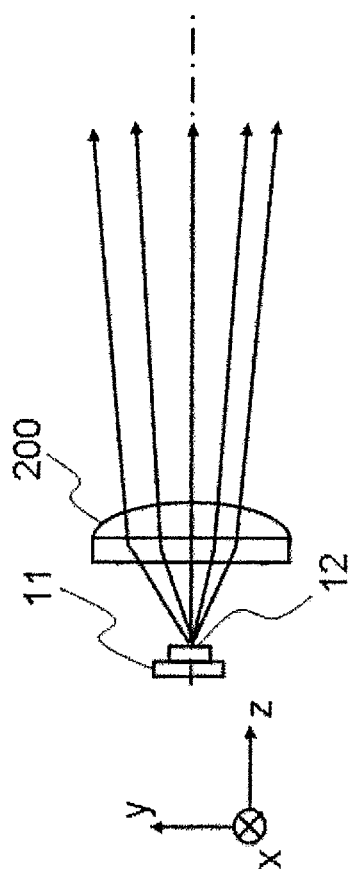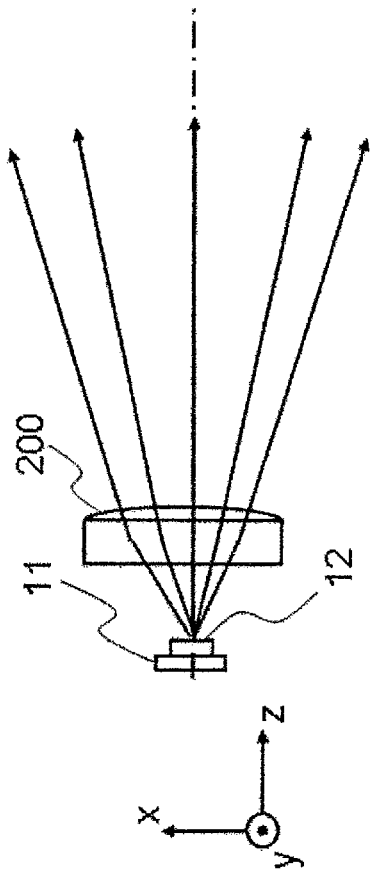
FIG. 11(A)
FIG. 11(B)

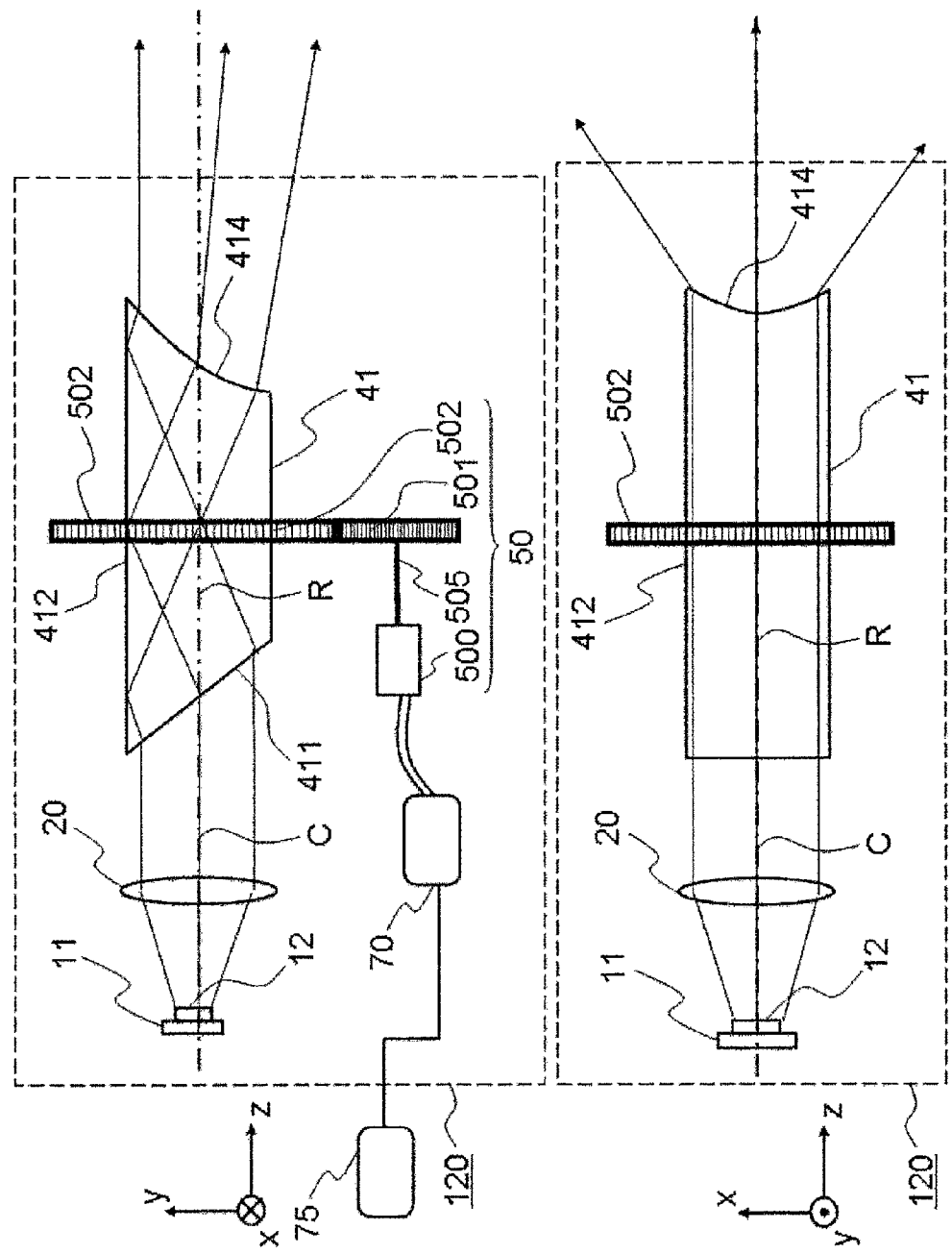

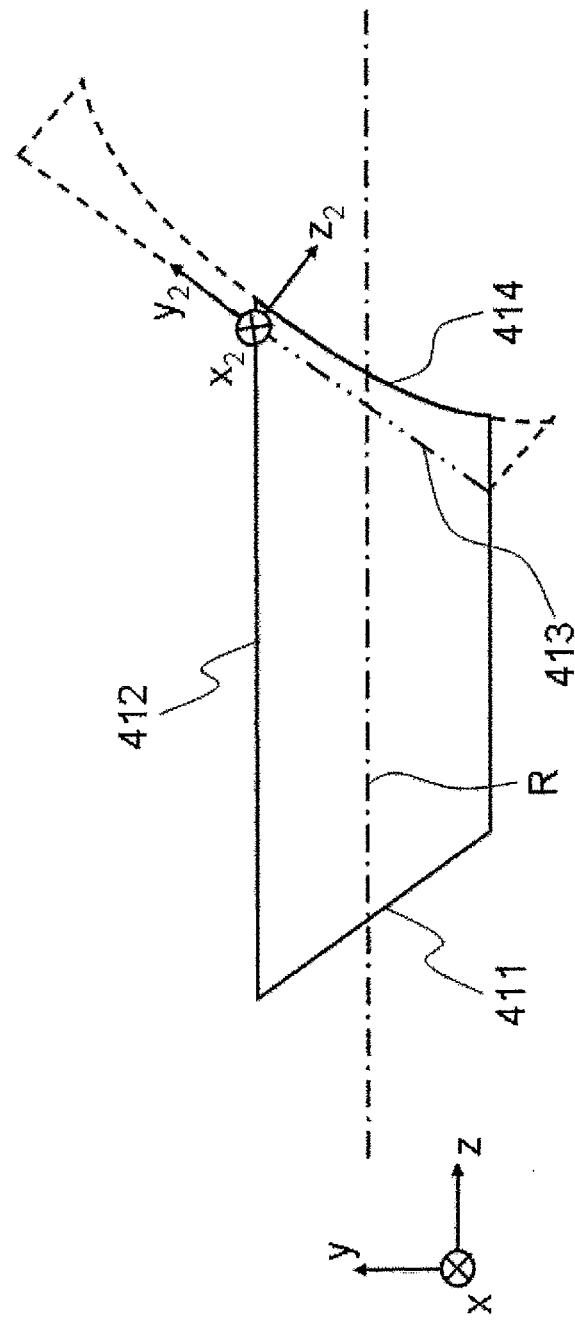

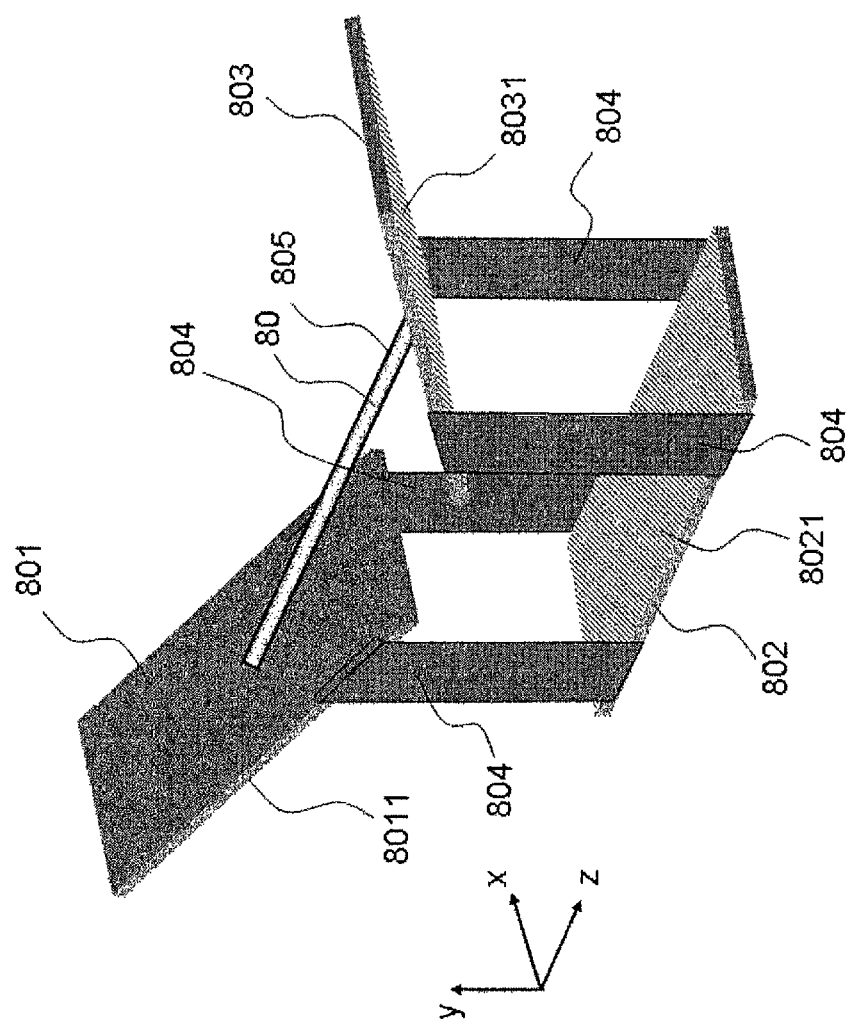

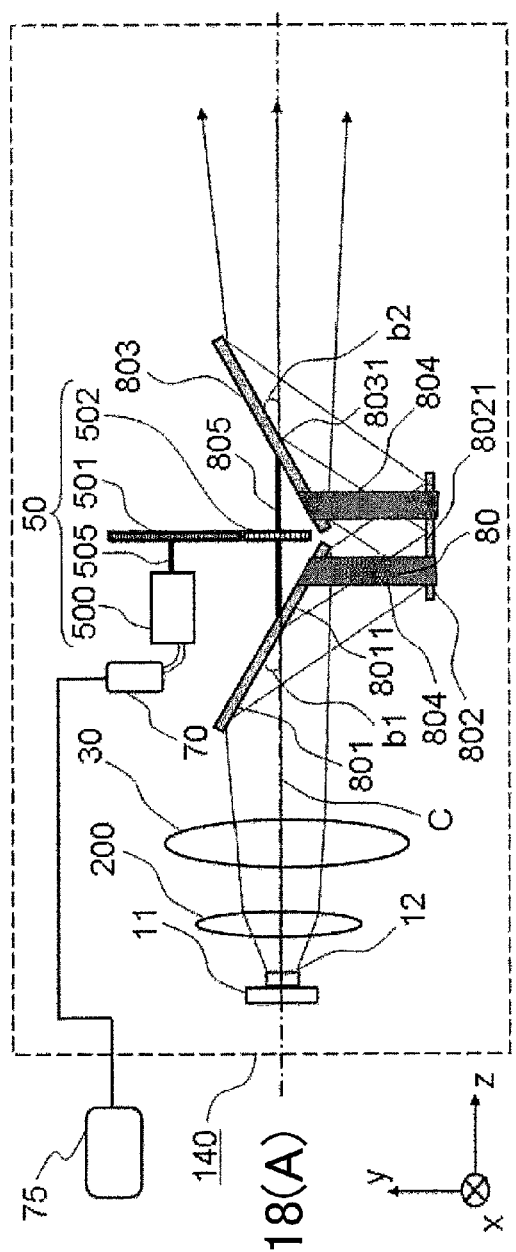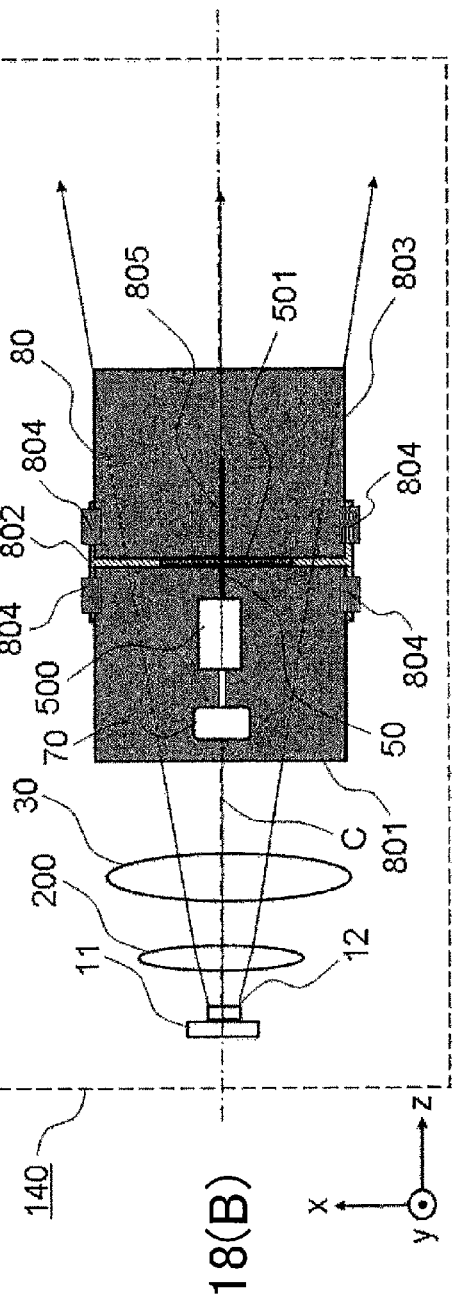
FIG. 18(A)
FIG. 18(B)

VEHICLE HEADLIGHT DEVICE

TECHNICAL FIELD

The present invention relates to a vehicle headlight device for illuminating an area in front of a vehicle.

BACKGROUND ART

Vehicles normally have vehicle headlight devices for illuminating areas in front of the vehicles. 'Front' means in a travel direction of a vehicle. To avoid unnecessary illumination of oncoming vehicles and preceding vehicles, an area illuminated by a vehicle headlight device is generally in a range of a vertically narrow and horizontally wide light distribution pattern. When a vehicle tilts as it turns a corner, however, the vehicle headlight device tilts together with the vehicle body. Therefore, there has been a problem of inadequate illumination in a corner area toward which the driver's gaze is directed.

For example, when a motorcycle makes a left turn at a corner, the motorcycle body tilts to the left. When this happens, a light distribution of a headlight device (headlamp) tilts down to the left and up to the right. The 'light distribution' indicates what intensity of light is emitted in what direction (angle) from a light source. The light distribution is accordingly a luminous intensity distribution of a light source with respect to a space. In other words, the light distribution is a spatial distribution of light emitted from a light source. At this time, a position lower than a corner area toward which a driver's (rider's) gaze is directed is illuminated. The corner area that should be illuminated therefore becomes dark. The corner area is an area in a travel direction of the vehicle. On the contrary, on the right side of the road in the travel direction, a position higher than the road surface is illuminated. So, it is worried that glaring light illuminates an oncoming vehicle. Incidentally, when the motorcycle body tilts to the left, because the motorcycle turns to the left, the corner area is on the left side of the road in the travel direction.

As a method of solving these problems, a method has been disclosed. The method includes a lamp body in which a light emitting body and a lens disposed in front of it are provided so as to be freely rotatable, a driving mechanism which rotates the light emitting body and the lens, a bank angle sensor which senses a bank angle of a vehicle body, and a rotation controller, and it is a method of rotating the light emitting body and the lens on the basis of the bank angle obtained from the bank angle sensor. (See, for example, patent reference 1). The 'bank angle' is an angle when a vehicle body is tilted from an upright position. The bank angle is measured as 0 degrees when the vehicle body stands upright and as 90 degrees when it is turned on its side.

PRIOR ART REFERENCES

Patent References

Patent reference 1: Japanese Patent Application Publication No. 2001-347977 (pages 2 to 5, FIG. 3)

SUMMARY OF THE INVENTION

Problems to be Solved by the Invention

A vehicle such as a motorcycle, however, generally has a headlight device (lamp body) of large diameter, in order to obtain illumination of sufficient spread. The vehicle headlight device in patent reference 1 rotates the light emitting device and the lens. Since the lens is large, the driving mechanism must have a motor capable of driving a large lens. The large load placed on the motor of the driving mechanism has therefore been a problem.

This invention is directed toward a solution to the above problems; it obtains a vehicle headlight device that illuminates the area toward which the driver's gaze is directed in the direction of travel. It also obtains a vehicle headlight device in which the load on the motor for rotating the illuminated area is reduced.

Means for Solving the Problems

A vehicle headlight device according to this invention has: a light source for emitting light; an optical element for receiving the light at an incidence surface, changing the propagation direction of the light to bring the light to a reflecting surface, reflecting the light at the reflecting surface, and changing the propagation direction of the reflected light at the exit surface from which the light exits; and a rotation mechanism for rotatably supporting the optical element with a line passing through the incidence surface and the exit surface as the axis of rotation, and rotating the optical element, according to the bank angle of the vehicle body, in the direction opposite to the bank direction of the vehicle body.

Effect of the Invention

When the vehicle body is tilted, the vehicle headlight device according to this invention can reduce the load on the motor and illuminate the area toward which the driver's gaze is directed in the direction of travel.

BRIEF DESCRIPTION OF THE DRAWINGS

FIGS. 8(A) and 8(B) illustrate drawings showing the area illuminated by the vehicle headlight device according to the first embodiment of this invention when the vehicle is tilted at a bank angle.

FIGS. 9(A) and 9(B) illustrate drawings showing the area illuminated by the vehicle headlight device according to the first embodiment of this invention when the vehicle travels around a corner.

FIGS. 10(A) and 10(B) illustrate drawings showing a vehicle headlight device according to a second embodiment of this invention.

FIGS. 11(A) and 11(B) illustrate drawings showing a condenser lens in the vehicle headlight device according to the second embodiment of this invention.

FIGS. 12(A) and 12(B) illustrate drawings showing a vehicle headlight device according to a third embodiment of this invention.

FIG. 13 is a side view of the Dove prism of the vehicle headlight device according to the third embodiment of this invention.

FIG. 15 is a perspective view of the rotation mirror in the vehicle headlight device according to the fourth embodiment of this invention.

FIGS. 18(A) and 18(B) illustrate drawings showing a vehicle headlight device according to a fifth embodiment of this invention.

MODE FOR CARRYING OUT THE INVENTION

The vehicle headlight device according to this invention directs light rays forming a light distribution pattern (patterned light) onto a Dove prism or a rotation mirror. When the vehicle turns a corner, for example, the Dove prism or rotation mirror is rotated around the optical axis. The angle of rotation of the Dove prism or the angle of rotation of the rotation mirror is an angle that corresponds to the bank angle of the vehicle body. The vehicle headlight device expands and outputs the rotated light pattern.

First Embodiment

Figure 1:
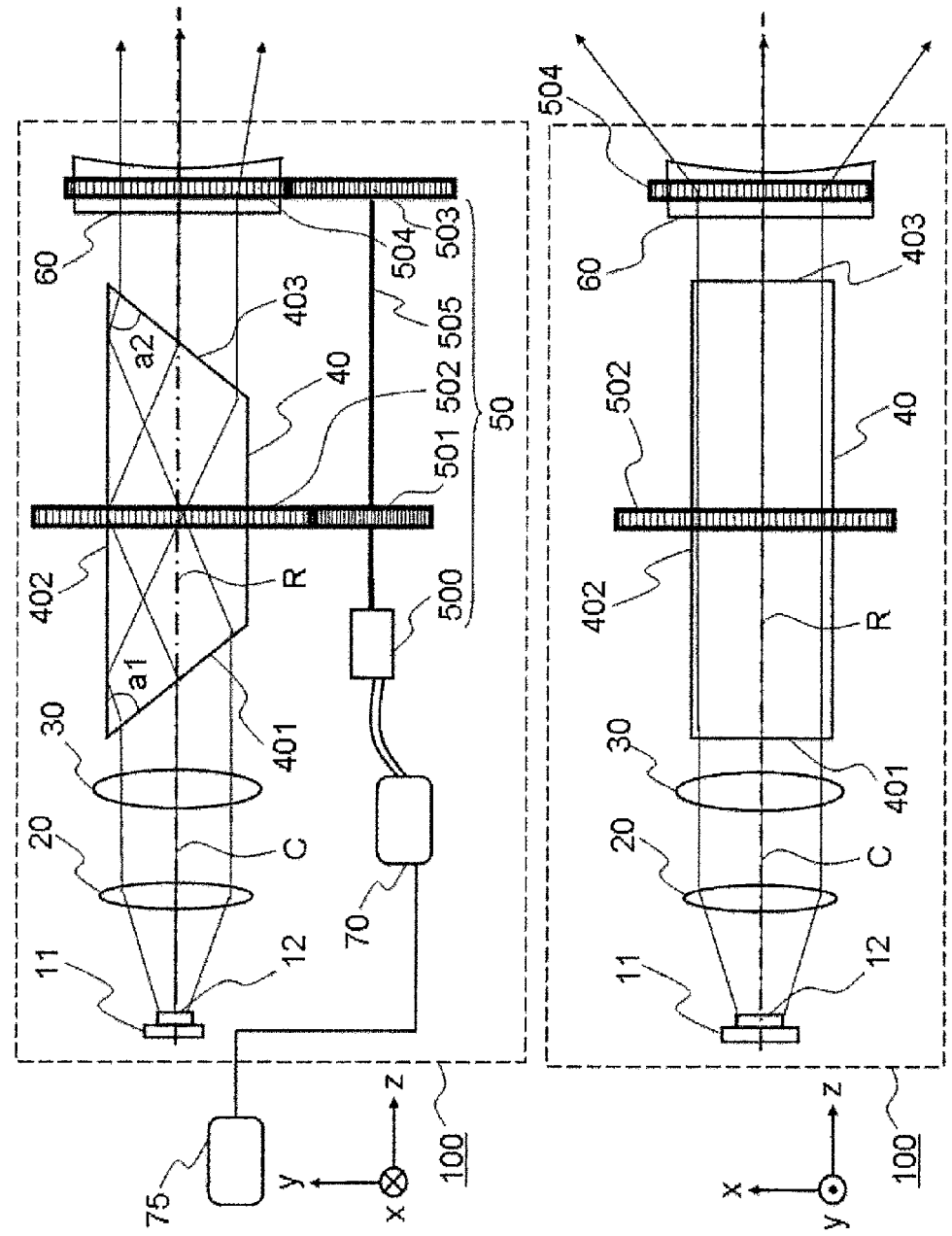
FIGS. 1(A) and 1(B) illustrate drawings showing a vehicle headlight device according to a first embodiment of this invention.

FIG. 1 illustrates drawings schematically showing the structure of a vehicle headlight device 100 according to a first embodiment of this invention. FIG. 1(A) is a side view of the vehicle headlight device 100. FIG. 1(B) is a top view of the vehicle headlight device 100. FIG. 1 shows the components of the vehicle headlight device 100 surrounded with a dashed line.

For ease of explanation of the drawings, xyz-coordinates will be used below. When the vehicle body is not tilted, the z-x plane is a horizontal plane. The z-axis indicates the longitudinal direction of the vehicle body. The positive z-axis direction indicates the front side of the vehicle body. The negative z-axis direction indicates the rear side of the vehicle body. The x-axis indicates the lateral direction of the vehicle body. The positive x-axis direction is to the left when facing front. The negative x-axis direction is to the right when facing front. The y-axis indicates the direction perpendicular to the z-x plane. The positive y-axis direction is the upward direction (the direction toward the sky). The negative y-axis direction is the downward direction (the direction toward the ground).

Here, a 'horizontal plane' is a plane parallel to the road surface. Road surfaces may be inclined in the direction of travel of a vehicle. That is, they may run uphill or downhill. In these cases, the 'horizontal plane' is tilted in the direction of travel of the vehicle. That is, it is not a plane perpendicular to the direction of gravity. Road surfaces, however, are seldom tilted in the right-left direction from the direction of travel of the vehicle. The 'right-left direction' is the width direction of the road. A 'horizontal plane' is perpendicular to the direction of gravity in the right-left direction. For example, if the road surface is tilted in the right-left direction, then even if a vehicle is upright with respect to the road surface in the right-left direction, this is equivalent to the vehicle's being tilted in the right-left direction with respect to the 'horizontal plane'. To simplify the following description, a 'horizontal plane' will be treated as a plane perpendicular to the direction of gravity.

The vehicle headlight device 100 has a light source 11 and a Dove prism 40. The vehicle headlight device 100 may also have a projection lens 60. The vehicle headlight device 100 may further have a collimating lens 20. The vehicle headlight device 100 may still further have a light distribution pattern forming unit 30. Components 11, 20, 30, 40, and 60 are disposed on the light path of the light source 11 in the order of light source 11, collimating lens 20, light distribution pattern forming unit 30, Dove prism 40, and projection lens 60. In FIG. 1, the light source 11 emits light in the positive z-axis direction. Components 11, 20, 30, 40, and 60 are disposed on the z-axis from the negative z-axis direction toward the positive z-axis direction.

The Dove prism 40 and projection lens 60 in FIG. 1 are rotatable, with the optical axis C as their axis of rotation. The optical axis C in FIG. 1 is parallel to the z-axis. The optical axis is depicted in FIG. 1 by a line connecting the center of the light emitting surface 12 of the light source 11 and the center of the projection lens 60. A light ray output from the center of the light source 11 at a right angle to the light emitting surface 12 propagates on the optical axis.

The vehicle headlight device 100 may include a rotation mechanism 50. The vehicle headlight device 100 may also include a control circuit 70. The rotation mechanism 50 turns the Dove prism 40 and the projection lens 60. The amount of rotation of the rotation mechanism 50 is controlled by a control circuit 70. The 'amount of rotation of the rotation mechanism 50' means the amount by which the rotation mechanism 50 turns the Dove prism 40 and projection lens 60.

The individual components will now be described. The light source 11 outputs light from its light emitting surface 12. The light source 11 is, for example, a light emitting diode (LED), an electroluminescence element, a semiconductor laser, or the like. When a light emitting diode is used as the light source 11, for example, the light source 11 is a surface emission light source. In the first embodiment, the light source 11 is represented as a surface emission light source outputting light from its light emitting surface 12. The light source 11 may, however, be another type of light source. For example, the light source 11 may be a point light source, such as a semiconductor laser light source.

The light source 11 emits light toward the collimating lens 20. The collimating lens 20 converts incident light into collimated light. The collimating lens 20 has positive refractive power. Refractive power is also referred to as power. 'Refractive power' is the degree to which light is bent. The light emitted from the light source 11 is converted into collimated light by passage through the collimating lens 20.

The light distribution pattern forming unit 30 forms incident light into a prescribed light distribution pattern. To 'form' is to shape. Here it means to change the light distribution pattern of the light emitted from the light source 11 to a desired pattern. The collimated light output from the collimating lens 20 is converted by passage through the light distribution pattern forming unit 30 into patterned light with a prescribed light distribution pattern. The 'prescribed light distribution pattern' is, for example, a vertically narrow and horizontally wide light distribution pattern.

Figure 2:
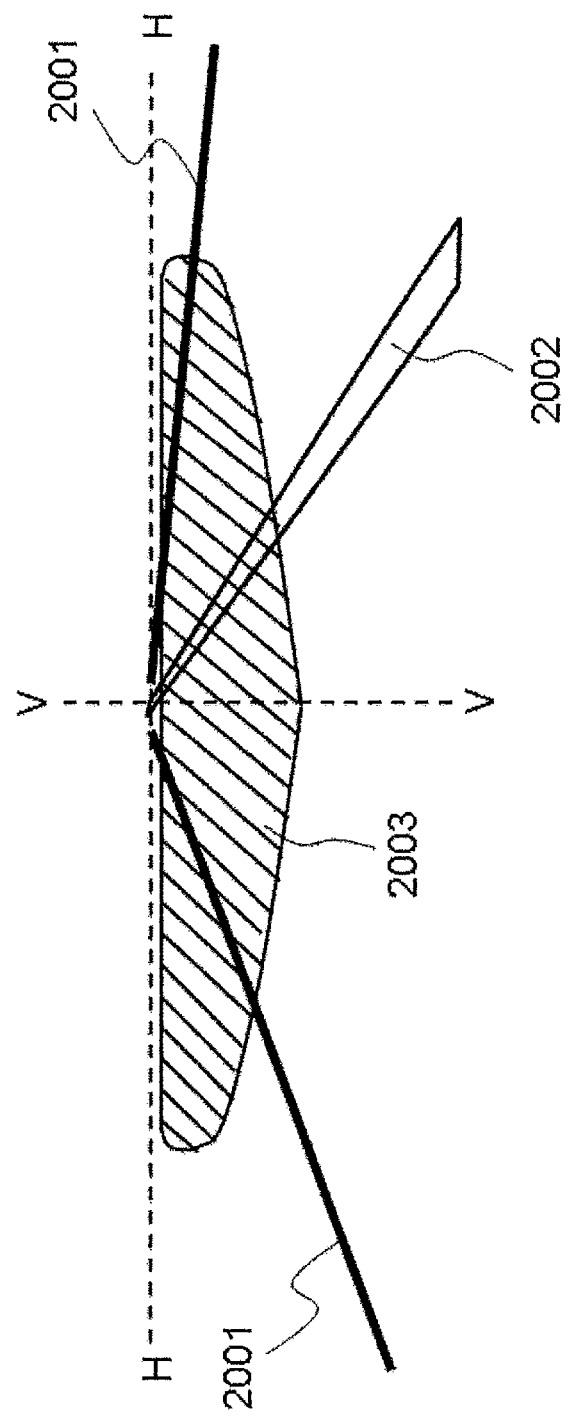
FIG. 2 is a drawing showing the area illuminated by the vehicle headlight device according to the first embodiment of this invention during travel straight ahead.

FIG. 2 is a drawing showing an exemplary illuminated area 2003 created by a vehicle traveling in the left lane, without body tilt, on a straight road. The illuminated area 2003 is the extent illuminated by light from the vehicle headlight device 100. For ease of explanation, it is assumed that the road is level, not inclined. Line H-H represents a horizontal line; line V-V represents a vertical line at the position of the vehicle body. 'Vertical' is the direction of gravity. There are road edges 2001 on the right and left of line V-V. On the right of line V-V, there is a center line 2001. For simplicity, the following description, including other embodiments, will proceed under the presumption that the road surface is not inclined. The following drawings that show the illuminated area 2003 will illustrate the case in which the vehicle is traveling in the left lane, as in FIG. 2.

The illuminated area 2003 has a vertically narrow and horizontally wide shape. The upper side of the illuminated area 2003 has the shape of a straight line parallel to line H-H. The lower side of the illuminated area 2003 has a convex shape projecting farthest downward at the position of line V-V.

The shape of the light output by the vehicle headlight device 100 (the illuminated area 2003) is accordingly not a round shape, but a shape elongated in the right-left direction. Such a horizontally elongate illuminated area 2003 makes people, vehicles, and so on that are about to cross the road visible. The illuminated area 2003 preferably has a shape such that glaring light is not directed at oncoming vehicles traveling in the opposite lane. That is why the upper side of the illuminated area 2003 has a non-protruding flat shape. The light distribution pattern forming unit 30 forms the shape of this illuminated area 2003 as a prescribed light distribution pattern.

One method of forming the light distribution pattern here uses a light blocking plate or the like having a window with the prescribed light distribution pattern. The light utilization efficiency of this method is poor because it generates light that is not used as distribution light. Another method uses lens curvature, and converts all the incident light into a prescribed light distribution pattern by such means as making the vertical curvature greater than the horizontal curvature. The use of this kind of lens enables incident light to be utilized without waste, so it is preferable to a light blocking plate. 'Curvature' is a quantity indicating how curved a curved line or curved surface is. For example, the curvature of the circumference of a circle of radius r is 1/r; the curvature increases as the curve becomes tighter.

When the light emitting surface 12 of the light source 11 is not circular but has a rectangular shape, the light distribution pattern forming unit 30 receives, through the collimating lens 20, collimated light having a rectangular shape. The incident rectangle of collimated light can be reshaped to match the shape of the illuminated area 2003 by changing the vertical curvature and horizontal curvature of the light distribution pattern forming unit 30.

This eliminates the need to have a shape including unnecessary regions, as when a light beam is masked by a light blocking plate. That is, it eliminates the need to have a component with a shape larger than the necessary light beam. Accordingly, the size of the light distribution pattern forming unit 30 can be reduced. Since almost all of the light emitted output by light source 11 is utilized, the utilization efficiency of the light increases, and a bright vehicle headlight device can be obtained.

As a vehicle headlight device 100 according to this embodiment, FIG. 1 shows a device having a collimating lens 20 and light distribution pattern forming unit 30. If the light source 11 can direct collimated light onto the light distribution pattern forming unit 30, however, the collimating lens 20 is not necessarily required. In addition, if the light source 11 can direct collimated light formed into a prescribed light distribution pattern onto the Dove prism 40, the collimating lens 20 and light distribution pattern forming unit 30 are not necessarily required.

Figure 3:
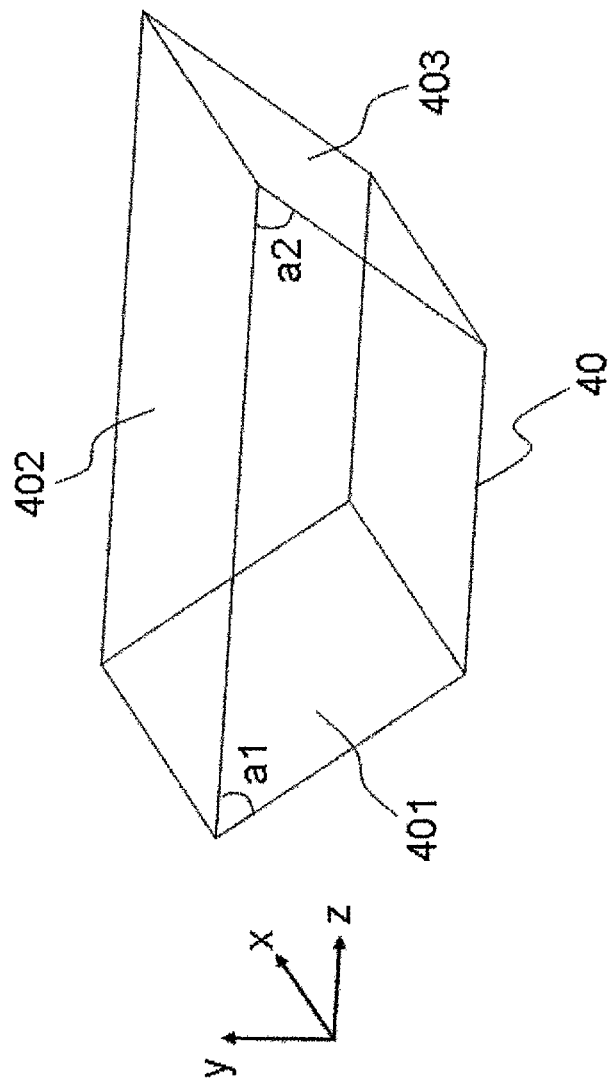
FIG. 3 is a perspective drawing of the Dove prism in the vehicle headlight device according to the first embodiment of this invention.

FIG. 3 is a perspective view of the Dove prism 40. The Dove prism 40 is a columnar prism with two trapezoidal shapes. That is, the Dove prism 40 has an angular columnar shape with two faces that have trapezoidal shapes. The two trapezoidal parts are used as sides of the prism. Light enters from the surface including one leg of the trapezoidal shapes and exits from the surface including the other leg of the trapezoidal shapes. The 'legs' are a pair of opposite sides of a trapezoid, excluding the upper base and lower base. In FIG. 3, surface 401 is the incidence surface and surface 403 is the exit surface. Surface 402 is a surface including a base of the trapezoids. 'Trapezoidal shapes' include shapes with curved legs, as well as shapes with straight legs. That is, 'Dove prisms' also include ones having curved incidence surfaces 401 and exit surfaces 403 instead of flat surfaces. A 'Dove prism' is also an optical element.

The patterned light incident on the incidence surface 401 is brought to the reflecting surface 402. The patterned light is internally reflected by the reflecting surface 402 and exits from the exit surface 403. The patterned light enters from the incidence surface 401. The incident patterned light is reflected by the reflecting surface 402 and exits from the exit surface 403. The reflecting surface 402 is shown here as, for example, a total reflecting surface that completely reflects the patterned light. The light utilization efficiency is improved because the patterned light is totally reflected by the reflecting surface 402.

Here, let the angle between the incidence surface 401 and reflecting surface 402 be angle a1. Let the angle between the reflecting surface 402 and the exit surface 403 be angle a2. If the side surfaces have an isosceles trapezoidal shape, angle a1 equals angle a2. In this case, light entering from the center of the incidence surface 401 and parallel to the z-axis is not inclined with respect the z-axis when output from the exit surface 403. That is, light entering from the center of the incidence surface 401 and parallel to the z-axis exits from the center of the exit surface 403 as light parallel to the z-axis. For example, the Dove prism 40 is supported in such a way that the center of the incidence surface 401 and the center of the exit surface 403 are at the center of the incident light beam. The center of the incident light beam passes through the center of the incidence surface 401 and the center of the exit surface 402.

If angle a1 is larger than angle a2, light entering from the center of the incidence surface 401 is inclined in the positive direction (upward in FIG. 3) on the y-axis when output from the exit surface 403. That is, the light output from the exit surface 403 exits at an inclination toward the reflecting surface 402. Conversely, if angle a1 is smaller than angle a2, the light entering from the center of the incidence surface 401 is inclined in the negative direction (downward in FIG. 3) on the y-axis when output from the exit surface 403. That is, the light output from the exit surface 403 exits at an inclination toward the side opposite the reflecting surface 402.

The Dove prism 40 in FIG. 1 is rotated, rotating the patterned light, with the optical axis C as the axis of rotation. The optical axis C is aligned with the light ray emitted perpendicularly to the light emitting surface 12 from the center of the light source 11. That is, the ray located in the center of the light beam emitted from the light source 11 propagates on the optical axis C. This ray is made incident at the central position of the incidence surface 401. Since angle a1 equals angle a2 in FIG. 1, the optical axis C is a line passing through the centers of the incidence surface 401 and exit surface 403, parallel to the z-axis. In FIG. 1, the optical axis C is represented by a dash-dot line. The Dove prism 40 rotates around the optical axis C.

The axis of rotation R of the Dove prism 40 may, however, be an axis other than the optical axis C. In order to rotate patterned light 4000b on the exit surface 403 side with respect to patterned light 4000a on the incidence surface 401 side, it suffices to rotate the Dove prism 40 around a line passing through the incidence surface 401 and exit surface 403 as the axis of rotation R. The patterned light 4000b is then both rotated in the x-y plane and translated in the x-y plane in the x-axis direction or y-axis direction. This makes it difficult to form the illuminated area 2003. Design constraints and the like, however, allow the Dove prism 40 to be inclined to the optical axis C to such an extent as not to raise any major problems in forming the illuminated area 2003. If the axis of rotation is inclined with respect to the Dove prism 40, it does not pass through the center of the Dove prism 40. That is, the Dove prism 40 rotates around an eccentric axis. The Dove prism 40 therefore needs more space in which to rotate, increasing the size of the device.

The axis of rotation R of the Dove prism 40 may be a line parallel to the reflecting surface 402 and perpendicular to the line of intersection of the incidence surface 401 with a plane parallel to the reflecting surface 402. In this case, it is possible to keep the patterned light 4000b from moving in the x-axis direction or y-axis direction on the x-y plane. Even in this case, however, when the axis of rotation passes through a position that deviates from the center of the incidence surface 401, it is necessary to enlarge the incidence surface in order to receive the light.

Therefore, the axis of rotation R of the Dove prism 40 can be set as a line passing through the center of the incidence surface 401, parallel to the reflecting surface 402 and perpendicular to the line of intersection of the incidence surface 401 with a plane parallel to the reflecting surface 402. In this case, the Dove prism 40 needs less space in which to rotate, enabling the size of the device to be reduced. The axis of rotation may be aligned with the center of the beam of light incident on the incidence surface 401. In this case, the size of the incidence surface 401 of the Dove prism 40 can be minimized. Accordingly, the size of the Dove prism 40 can be minimized.

A Dove prism 40 with angle a1 and angle a2 set to the same angle may be used. The axis of rotation of the Dove prism 40 is a line parallel to the reflecting surface 402 and perpendicular to the line of intersection of the incidence surface 401 with a plane parallel to the reflecting surface 402. The axis of rotation R is set so as to pass through the center of the incidence surface 401. The axis of rotation R also coincides with the center of the light beam incident on the incidence surface 401. In this case, when the patterned light 4000a is rotated, the center of the patterned light 4000a coincides with the center of rotation. The patterned light 4000b therefore rotates on the x-y plane without moving in the x-axis direction or y-axis direction. That is, the size of the vehicle headlight device 100 can be minimized and an appropriate light distribution area can be set easily.

The present invention will be described on the assumption that angle a1 equals angle a2. This is because isosceles trapezoidal sides of the Dove prism 40 can help keep the design in the subsequent stages from becoming complicated. The 'subsequent stages' here are the stages after light exits the Dove prism 40. In the vehicle headlight device 100 in FIG. 1 the design of the projection lens 60 would become complicated.

Figure 4:
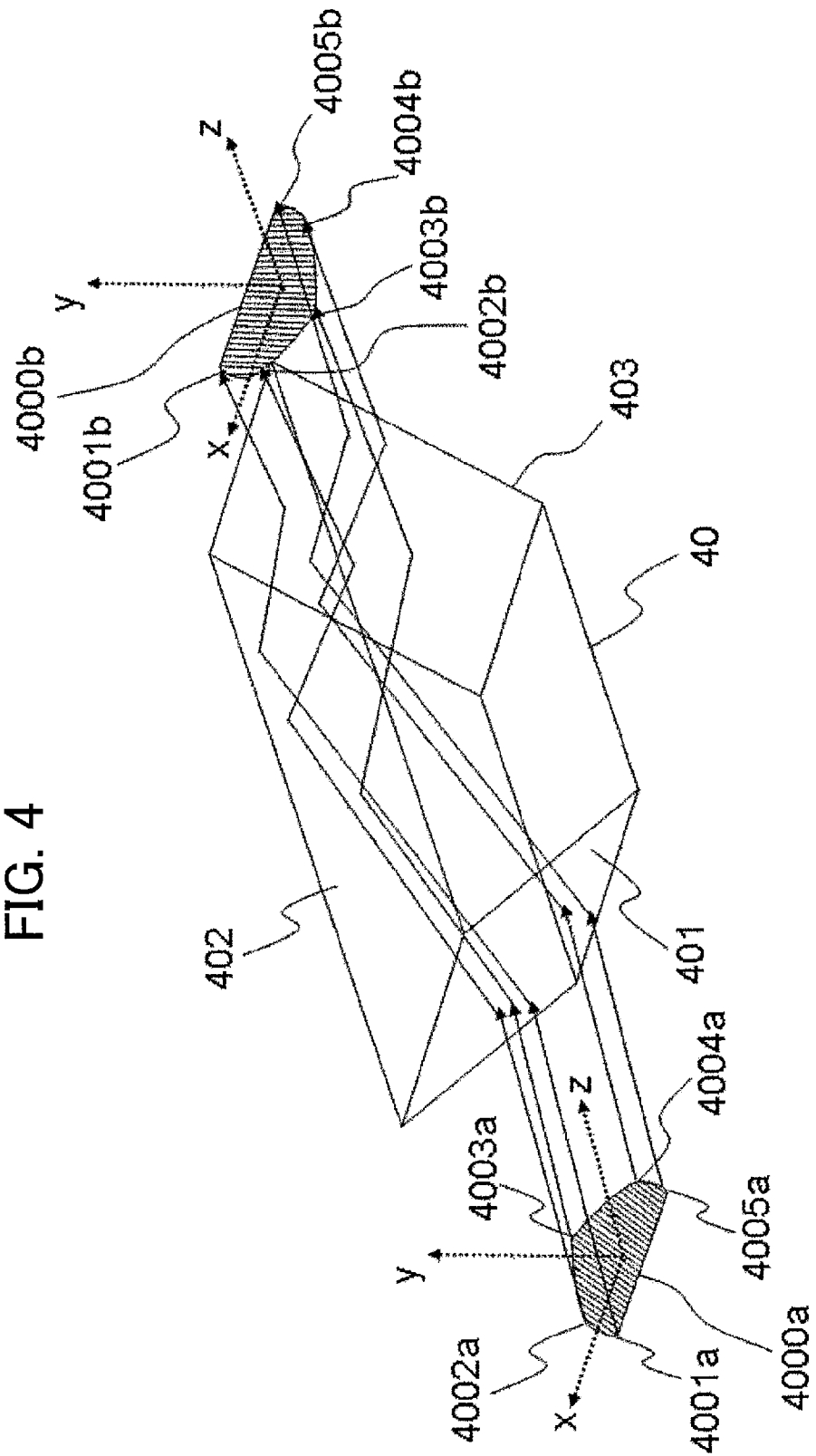
FIG. 4 is a drawing showing the shift in the light distribution pattern when the Dove prism is not rotated.

FIG. 4 is a drawing showing the shift in the light distribution pattern when the Dove prism 40 is not rotated. Positions 4001a, 4002a, 4003a, 4004a, and 4005a indicate prescribed positions in the patterned light 4000a before it enters the Dove prism 40. Positions 4001b, 4002b, 4003b, 4004b, and 4005b indicate positions in the patterned light 4000b that has exited the Dove prism 40, corresponding to positions 4001a, 4002a, 4003a, 4004a, and 4005a. Position 4001b corresponds to position 4001a. Position 4002b corresponds to position 4002a. Position 4003b corresponds to position 4003a. Position 4004b corresponds to position 4004a. Position 4005b corresponds to position 4005a. The xyz-coordinates indicated in FIG. 1 are shown at the positions of patterned light 4000a and 4000b in FIGS. 4 and 5. The xyz-coordinates are represented by finely dashed lines.

The light at position 4001a in patterned light 4000a enters from the incidence surface 401, is reflected by the reflecting surface 402, and then exits from the exit surface 403 and reaches position 4001b in patterned light 4000b. Similarly, the light at position 4002a, position 4003a, position 4004a, and position 4005a in patterned light 4000a enters from the incidence surface 401, is reflected by the reflecting surface 402, and then exits from the exit surface 403 and reaches position 4002b, position 4003b, position 4004b, and position 4005b in patterned light 4000b, respectively. That is, the light at position 4002a in patterned light 4000a enters from the incidence surface 401, is reflected by the reflecting surface 402, and then exits from the exit surface 403 and reaches position 4002b in patterned light 4000b. The light at position 4003a in patterned light 4000a enters from the incidence surface 401, is reflected by the reflecting surface 402, and then exits from the exit surface 403 and reaches position 4003b in patterned light 4000b. The light at position 4004a in patterned light 4000a enters from the incidence surface 401, is reflected by the reflecting surface 402, and then exits from the exit surface 403 and reaches position 4004b in patterned light 4000b. The light at position 4005a in patterned light 4000a enters from the incidence surface 401, is reflected by the reflecting surface 402, and then exits from the exit surface 403 and reaches position 4005b in patterned light 4000b.

As shown in FIG. 4, positions 4002a, 4003a, and position 4004a are located in the positive y-axis direction from positions 4001a and 4005a. Conversely, positions 4002b, 4003b, and position 4004b are located in the negative y-axis direction from positions 4004b and 4005b. Thus in the state in which the reflecting surface 402 of the Dove prism 40 is parallel to the z-x plane, the image of the pattern shape on the x-y plane on the incidence side of the Dove prism 40 changes to an image of a pattern shape that is reversed in the vertical direction on the x-y plane on the exit side. 'Vertical' here means in the y-axis direction. The x-y plane is a plane perpendicular to the z-axis.

Figure 5:
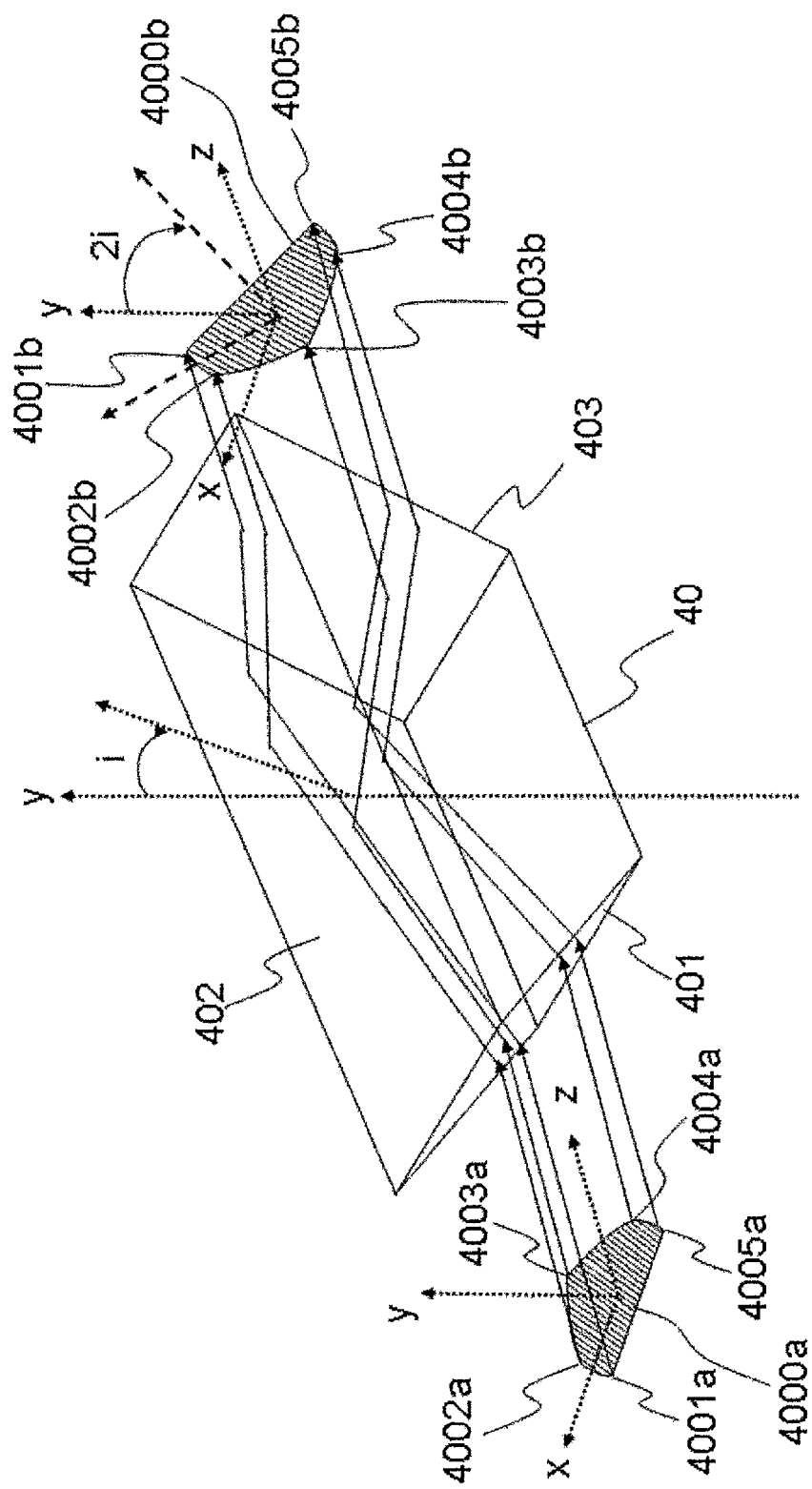
FIG. 5 is a drawing showing the shift in the light distribution pattern when the Dove prism is rotated.

FIG. 5 is a drawing showing the shift in the light distribution pattern when the Dove prism 40 is rotated by a rotational angle i. The axis of rotation R is parallel to the z-axis. The z-axis in FIG. 5 coincides with the center of the light beam and the axis of rotation R.

As in FIG. 4, the light at position 4001a, position 4002a, position 4003a, position 4004a, and position 4005a in patterned light 4000a enters from the incidence surface 401, is reflected by the reflecting surface 402, and then exits from the exit surface 403 and reaches position 4001b, position 4002b, position 4003b, position 4004b, and position 4005b in patterned light 4000b, respectively.

When the Dove prism 40 is rotated by a rotational angle i around an axis of rotation R that coincides with the center of the light beam, the image of the pattern shape in the x-y plane on the incidence side of the Dove prism 40 changes further from an image of a pattern shape that is vertically reversed in the x-y plane on the exit side to a shape that is rotated by a rotational angle 2i with the center axis of the light beam as the axis of rotation. When the Dove prism 40 rotates clockwise looking from the negative z-axis direction toward the positive z-axis direction by a rotational angle i, the patterned light 4000b on the exit side rotates clockwise by a rotational angle 2i. When the Dove prism 40 rotates counterclockwise looking from the negative z-axis direction toward the positive z-axis direction by a rotational angle i, the patterned light 4000b on the exit side rotates counterclockwise by a rotational angle 2i.

FIG. 5 shows the case in which the Dove prism 40 rotates clockwise looking from the negative z-axis direction toward the positive z-axis direction by a rotational angle i. FIG. 5 shows the rotated x-axis and y-axis by coarsely dashed lines. The y-axis is shown at the position of the Dove prism 40. The axis rotated clockwise from the y-axis by the rotational angle i is also shown. This axis rotated clockwise from the y-axis by the rotational angle i is perpendicular to the reflecting surface 402.

Because of the physical characteristics of this type of Dove prism, in order to rotate the light distribution pattern accurately by rotation of the Dove prism 40, it is desirable for the light incident on the incidence surface 401 to be parallel to the z-axis. The z-axis coincides with the optical axis C, the ray located in the center of the light beam (the center axis of the beam) emitted from the light source 11, and the axis of rotation R.

The rotation mechanism 50 shown in FIG. 1 rotatably supports the Dove prism 40 and projection lens 60 with the center axis of the light beam as their axis of rotation R. The axis of rotation R in FIG. 1 is parallel to the z-axis and passes through the center of the incidence surface 401 and the center of the exit surface 403. The optical axis C coincides with the axis of rotation R. The rotation mechanism 50 includes, for example, a stepping motor 500, gears 501, 502, 503, 504, and an axle 505. The rotation mechanism 50 rotates the Dove prism 40 and projection lens 60 on the basis of an amount of rotation obtained from the control circuit 70. In the first embodiment, the gears 501, 502, 503, 504 are designed so that the Dove prism 40 turns by half as much as the projection lens 60.

The axle 505 is mounted on the shaft of the stepping motor 500. Gears 501 and 503 are mounted on the axle 505. As the shaft of the stepping motor 500 turns, the axle 505 rotates around its axis. As the axle 505 rotates around its axis, gears 501 and 503 rotate. Gear 501 meshes with gear 502. As gear 501 rotates, gear 502 rotates. Gear 503 meshes with gear 504. As gear 503 rotates, gear 504 rotates. Gear 502 is mounted on the Dove prism 40 around its axis of rotation R and surrounds the Dove prism 40. Gear 504 is mounted on the projection lens 60 around its optical axis C and surrounds the projection lens 60. In FIG. 1, the axle 505 is disposed parallel to the optical axis C.

Figure 6:
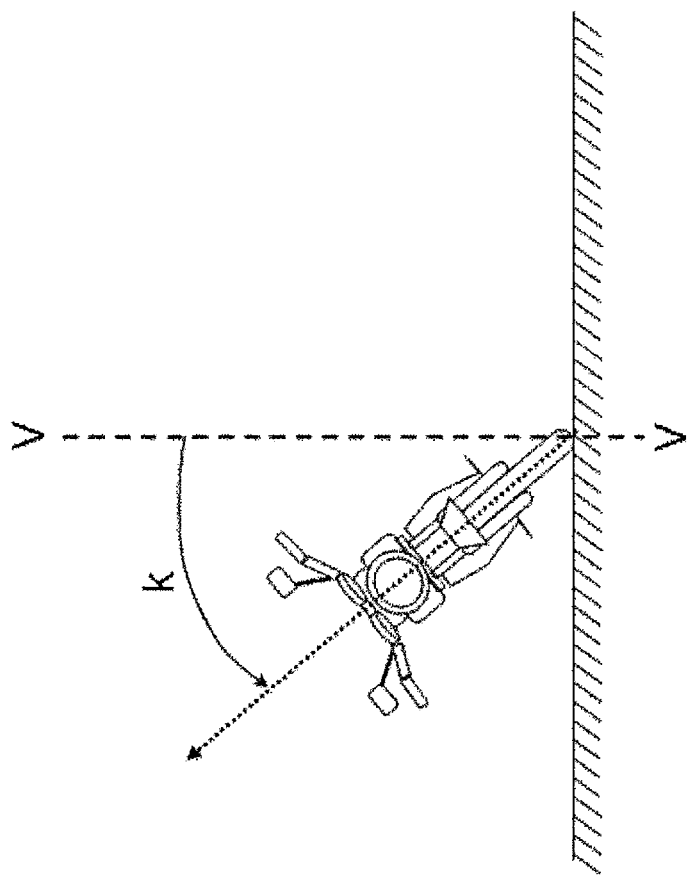
FIG. 6 is a drawing illustrating the bank angle of a motorcycle.

FIG. 6 is a drawing illustrating the bank angle k of a motorcycle. The 'bank angle' is the angle at which the vehicle body is tilted from the vertical state. The bank angle is measured as 0 degrees when the vehicle body is set upright and 90 degrees when it is laid on its side. In FIG. 6, the motorcycle body is tilted at a bank angle k to the right in its direction of travel. Line V-V represents a vertical line at the position of the vehicle body. The direction of tilt of the vehicle body is referred to as the bank direction. The 'bank direction' indicates the direction in which the vehicle body has rotated around the position at which the vehicle body makes contact with the ground. That is, tilting the vehicle body by a bank angle k is equivalent to rotating it by the bank angle k around the position at which the vehicle body makes contact with the ground. In FIG. 6, the position at which the vehicle body makes contact with the ground is the position at which its wheels make contact with the ground.

A motorcycle vehicle has a vehicle tilt sensor 75 for detecting the bank angle k of the motorcycle as in FIG. 6. The control circuit 70 receives a signal giving the bank angle k of the vehicle body detected by the vehicle tilt sensor 75. The control circuit 70 then performs computations based on this signal to control the stepping motor 500. The vehicle tilt sensor 75 is a gyro or similar sensor.

If the bank angle of the motorcycle vehicle is an angle k here, the control circuit 70 controls the Dove prism 40 and the projection lens 60 so that the Dove prism 40 rotates by an angle of k/2 in the direction opposite to the direction of tilt (bank direction) of the vehicle body, and the projection lens 60 rotates by angle k in the direction opposite to the direction of tilt (bank direction) of the vehicle body. That is, the rotation mechanism 50 rotates the Dove prism 40 according to the bank angle of the vehicle body, in the direction opposite to the bank direction of the vehicle body. In FIG. 6, the motorcycle is tilted to the right of its direction of travel. That is, the motorcycle is rotated clockwise in its direction of travel. In this case, the bank direction is the clockwise direction as seen looking in the direction of travel. The Dove prism 40 therefore rotates by a rotational angle of k/2 counterclockwise as seen from behind in FIG. 6, looking in the direction of travel. The projection lens 60 rotates by a rotational angle of k counterclockwise as seen from behind, looking in the direction of travel.

The rotation mechanism 50 only needs to be able to rotate the Dove prism 40 with the axis of rotation R as its axis of rotation. The rotation mechanism 50 only needs to be able to rotate the projection lens 60 with the optical axis C as its axis of rotation. Therefore, any rotary mechanism may be used, not limited to the above configuration. For example, it is possible to provide multiple stepping motors and control their individual amounts of rotation to achieve the intended purpose.

Figure 7A:
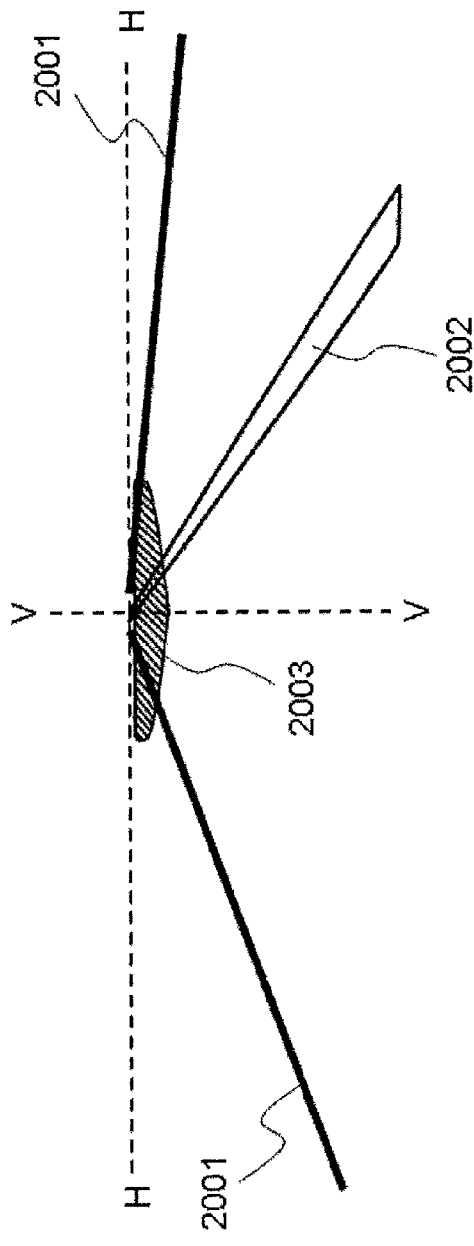
FIGS. 7(A) and 7(B) illustrate drawings showing the area illuminated by the vehicle headlight device according to the first embodiment of this invention when the vehicle is traveling straight ahead.
Figure 7B:
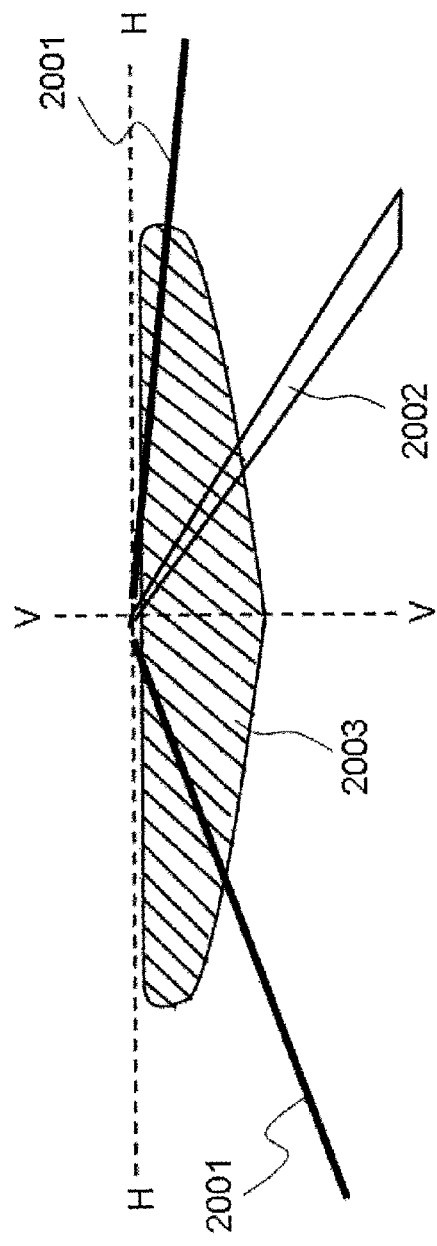

The projection lens 60 converts the patterned light exiting the Dove prism 40 to arbitrary ray angles such that the road surface is illuminated with a broadened light distribution. The 'ray angles' are the angles of the light rays with respect to the optical axis C. FIG. 7 illustrates drawings showing the illuminated area 2003 illuminated by the vehicle headlight device 100 according to the first embodiment when the vehicle is traveling straight ahead. Here, FIG. 7(A) is a drawing showing the illuminated area 2003 without the projection lens 60. FIG. 7(B) is a drawing showing the illuminated area 2003 when the projection lens 60 is present.

In FIG. 7(A), the collimated light exiting the Dove prism 40 illuminates the road surface directly and the illuminated area 2003 is not expanded; the ray angles are 0 degrees. The light exiting the Dove prism 40 travels parallel to the optical axis C. When the projection lens 60 is used, however, as in FIG. 7(B), the light exiting the Dove prism 40 is output by the projection lens 60 with its ray angles converted to optimal ray angles. The illuminated area 2003 can thereby be expanded.

Alternatively, the projection lens 60 may simply enlarge the light distribution pattern emitted from the Dove prism 40 and project the enlarged pattern. In this case, the projection lens 60 is formed with a surface that is rotationally symmetrical around the optical axis C. Therefore, the projection lens 60 need not be rotated when the vehicle body tilts.

The projection lens 60 may also be adapted to partially modify the light distribution pattern exiting the Dove prism 40 and enlarge and project the modified pattern. The cases in which to rotate the projection lens 60 are the cases in which the horizontal extent of the light distribution differs from the vertical extent of the light distribution. In these cases, the projection lens 60 is formed with a surface that is rotationally asymmetric around the optical axis C. When the vehicle body tilts, the projection lens 60 must therefore be rotated.

The prescribed illuminated area 2003 has a horizontally elongate shape, so the projection lens 60 forms a horizontally elongate light distribution pattern, matching the prescribed illuminated area. The light distribution pattern may be, for example, rectangular, elliptic, or the like. This eliminates the need to have a shape including unnecessary areas, as there would be with a blocking plate, so the size of the projection lens 60 can be reduced. The projection lens 60 can thus be formed with a smaller shape than the lamp bodies of conventional vehicle headlight devices.

Next, how the vehicle headlight device 100 according to the first embodiment operates in accordance with the bank angle k will be described. When the vehicle body is not tilted, the control circuit 70 receives a signal indicating that the bank angle k is 0 degrees. The control circuit 70 then controls the stepping motor 500 so that it is at its reference position. This holds the Dove prism 40 at a position where the reflecting surface 402 is parallel to the z-x plane. Similarly, the projection lens 60 is held at an optimum position, matched to the region of collimated light in the prescribed light distribution pattern, for expanding the illuminated area 2003 as in FIG. 7(B).

When the vehicle body is tilted at a bank angle k, the control circuit 70 receives from the vehicle tilt sensor 75 a signal indicating that the bank angle is angle k. The control circuit 70 now controls the stepping motor 500 so as to rotate the Dove prism 40 by an angle of k/2 in a direction opposite to the direction of tilt of the vehicle body. The control circuit 70 also controls the stepping motor 500 so as to rotate the projection lens 60 by angle k in the direction opposite to the direction of tilt of the vehicle body. In the configuration shown in FIGS. 1(A) and 1(B) the Dove prism 40 and projection lens 60 are driven by a single stepping motor 500. The rotational angle is adjusted in advance by the numbers of teeth of the gears 501, 502, 503, 504.

FIG. 8 illustrates drawings showing illuminated areas when the vehicle body is tilted at a bank angle k. In FIG. 8, since the road curves to the left, the vehicle body is tilted to the left, as seen looking in its direction of travel. Here, FIG. 8(A) is a drawing showing the state of the illuminated area 2003 when the control circuit 70 does not operate. FIG. 8(B) is a drawing showing the illuminated area 2003 when the control circuit 70 is operating. In FIG. 8(A), the illuminated area 2003 is tilted to the left by angle k. For this reason, the corner area 2004 at front left is outside the illuminated area 2003. Thus the problem of unsatisfactory illumination of the corner area 2004 toward which the driver's gaze is directed arises. At the same time, in the oncoming traffic lane at front right, the illuminated area 2003 extends above line H-H. A consequent problem is that glaring light is directed at oncoming vehicles. The corner area 2004 is indicated by a dotted line.

To address these problems, the rotation mechanism 50 rotates the Dove prism 40 by an angle of k/2 in the direction opposite to the direction of tilt of the vehicle body. In FIG. 8, the direction of tilt of the vehicle body is toward the left from the direction of travel. Accordingly, the rotational direction of the Dove prism 40 is clockwise in the direction of travel. When the Dove prism 40 rotates by an angle of k/2 in the direction opposite to the direction of tilt of the vehicle body, the light distribution pattern exiting the Dove prism 40 is rotated by an angle of k in the direction opposite to the direction of tilt. Therefore, regardless of the tilt angle of the vehicle body, the same light distribution pattern as when the vehicle body is not tilted can be obtained.

In addition, the projection lens 60 is rotated by angle k in the direction opposite to the tilt angle of the vehicle body. As described above, the projection lens 60 in this case is formed with a surface that is not rotationally symmetrical around the optical axis C. That is, the projection lens 60 partially modifies the light distribution pattern and enlarges and projects it. The projection lens 60 is rotated by angle k in the direction opposite to the direction of tilt of the vehicle body, whereby an illuminated area 2003 with the same shape as the light distribution pattern when the vehicle body is not tilted can be obtained regardless of the tilt angle of the vehicle body.

In FIG. 8(B), the inclination of the illuminated area 2003 is modified. The upper side of the illuminated area 2003 is parallel to line H-H. The corner area 2004 is therefore included within the extent of the illuminated area 2003. This solves the problem of unsatisfactory illumination of the corner area 2004 toward which the driver's gaze is directed. At front right, the illuminated area 2003 is below line H-H. The problem of directing glaring light at oncoming vehicles is therefore also solved. As the above shows, even when the vehicle body is tilted, the vehicle headlight device 100 can illuminate the corner area 2004 toward which the driver's gaze is directed.

The rotational angle of the Dove prism 40 is half the bank angle k. The rotational angle of the projection lens 60 is equal to the bank angle k. The illuminated area formed by rotating the Dove prism 40 and projection lens 60 is not in exactly the same position as the illuminated area when the vehicle is not tilted. However, it is possible to achieve the intended purpose of illuminating the corner area 2004 toward which the driver's gaze is directed. The reason why the illuminated area is not in exactly the same position is, for example, that when a motorcycle tilts, the height of its headlight device above the road surface is reduced. The height of the illuminated area 2003 is therefore also lowered. However, the position of the driver's eyes is also lowered, so there is no great problem.

FIG. 9 illustrates drawings showing the illuminated area 2003 when vehicles equipped with a vehicle headlight device 100 according to the first embodiment travel around corners. The corner area 2004 is indicated by a dotted line. FIG. 9(A) shows the state in which a vehicle traveling in the left lane rounds a corner curving to the left. FIG. 9(B)

illustrates the state in which a vehicle traveling in the left lane rounds a corner curving to the right. FIGS. 9(A) and 9(B) show the illuminated area 2003 after the light distribution pattern has been modified by the control circuit 70 and rotation mechanism 50. As mentioned above, the control circuit 70 rotates the light distribution pattern according to the bank angle k of the vehicle body. The control circuit 70 rotates the light distribution pattern according to the bank angle k of the vehicle body regardless of whether the vehicle body tilts to the right or left. Consequently, it becomes possible for the vehicle headlight device 100 to output light with the same light distribution pattern as when the vehicle body is not tilted.

In this way, by using the light distribution pattern forming unit 30, the vehicle headlight device 100 according to the first embodiment forms a light distribution pattern. By using the Dove prism 40, the vehicle headlight device 100 rotates the patterned light formed by the light distribution pattern forming unit 30 around the axis of rotation R according to the bank angle k of the vehicle body. By using the projection lens 60, the vehicle headlight device 100 expands and projects the rotated patterned light.

The vehicle headlight device 100 can thereby illuminate the area (corner area 2004) toward which the driver's gaze is directed in the direction of travel. The vehicle headlight device 100 does not rotate a large diameter lens, but rotates the smaller Dove prism 40. The vehicle headlight device 100 also rotates a small projection lens 60. As noted above, the vehicle headlight device 100 may employ a configuration in which the projection lens 60 is not rotated. This can reduce the drive motor load, in comparison with the case in which the light emitting device and lens provided in a conventional headlight device are rotated. In addition, there is no need to support a rotatable lens of large diameter, which has the effect that the size of the drive motor can be reduced.

The vehicle headlight device 100 has a light source 11, Dove prism (optical element) 40, and rotation mechanism 50. The light source 11 emits light. The Dove prism (optical element) 40 changes the direction of travel of the light incident on its incidence surface 401, brings the light to its reflecting surface 402, changes the direction of travel of the light reflected from the reflecting surface 402 at its exit surface 403, and outputs the light. The rotation mechanism 50 rotatably supports the Dove prism (optical element) 40, with a line passing through the incidence surface 401 and exit surface 403 as the axis of rotation R, and rotates the Dove prism 40 according to the bank angle k of the vehicle body, in the direction opposite to the bank direction of the vehicle body.

The axis of rotation R is a line parallel to the reflecting surface 402 and perpendicular to the line of intersection of the incidence surface 401 with a plane parallel to the reflecting surface 402. In the first embodiment, it is a line parallel to the z-axis. The axis of rotation R can be a line passing through the center position of the incidence surface 401. The axis of rotation R can also be made to coincide, on the incidence surface 401, with the central ray of the light beam incident on the incidence surface 401.

The Dove prism 40 has an incidence surface 401, an exit surface 403, and a reflecting surface 402. The incidence surface 401 is a surface including one leg of the trapezoidal shape of the Dove prism 40. The exit surface 403 is a surface including the other leg of the trapezoidal shape of the Dove prism 40. The reflecting surface 402 is a surface forming acute angles with the incidence surface 401 and exit surface 403. The reflecting surface 402 is a plane including one base of the trapezoidal shape of the Dove prism 40.

The rotation mechanism 50 rotates the Dove prism (optical element) 40 by a rotational amount equal to half the bank angle k.

The vehicle headlight device 100 further includes a projection lens 60 for expanding the light exiting the Dove prism (optical element) 40 and outputting the expanded light. The rotation mechanism 50 rotatably supports the projection lens 60, with the optical axis C as the axis of rotation, and rotates the projection lens 60 in the direction opposite the bank direction of the vehicle body. The amount of rotation of the projection lens 60 is the same as the bank angle k.

The vehicle headlight device 100 further includes a light distribution pattern forming unit 30. From the light emitted from the light source 11, the light distribution pattern forming unit 30 forms and outputs patterned light 4000a having a prescribed light distribution pattern.

The vehicle headlight device 100 further includes a collimating lens 20. The collimating lens 20 receives and collimates incident light emitted from the light source 11 and outputs the collimated light toward the light distribution pattern forming unit 30.

Second Embodiment

The vehicle headlight device 100 in the first embodiment provides a collimating lens 20 preceding the light distribution pattern forming unit 30 and delivers collimated light to the light distribution pattern forming unit 30. It also rotates the Dove prism 40 and projection lens 60 according to the bank angle k of the vehicle body. The vehicle headlight device 110 according to a second embodiment replaces the collimating lens 20 with a condenser lens 200 having positive power. The vehicle headlight device 110 is configured without a projection lens 60.

Here, components that are identical to components in the first embodiment are given identical reference characters and descriptions will be omitted. The components that are identical to components in the first embodiment are a light source 11, a light distribution pattern forming unit 30, a Dove prism 40, a rotation mechanism 50, a control circuit 70, and a vehicle tilt sensor 75. The vehicle headlight device 110 according to the second embodiment does not have a projection lens 60, so the rotation mechanism 50 does not have gears 503 and 504. The vehicle headlight device 110 may, however, be configured to include a projection lens 60.

FIG. 10 schematically shows the configuration of the vehicle headlight device 110 according to the second embodiment. Here, FIG. 10(A) is a side view of the vehicle headlight device 110. FIG. 10(B) is a top view of the vehicle headlight device 110.

To simplify the description of the drawings, the description below will use xyz coordinates. The xyz coordinates are defined in the same way as in the first embodiment. When the vehicle body is not tilted, the z-x plane is a horizontal plane. The z-axis indicates the longitudinal direction of the vehicle body. The positive z-axis direction indicates the front side of the vehicle body. The negative z-axis direction indicates the rear side of the vehicle body. The x-axis indicates the lateral direction of the vehicle body. The positive x-axis direction is to the left when facing front. The negative x-axis direction is to the right when facing front. The y-axis indicates the direction perpendicular to the z-x plane. The positive y-axis direction is the upward direction (the direction toward the sky). The negative y-axis direction is the downward direction (the direction toward the ground).

The vehicle headlight device 110 has a light source 11, condenser lens 200, and Dove prism 40. The vehicle headlight device 110 may also have a light distribution pattern forming unit 30. Components 11, 200, 30, and 40 are disposed on the light path of the light source 11 in the order of light source 11, condenser lens 200, light distribution pattern forming unit 30, and Dove prism 40. In FIGS. 10(A) and 10(B), the light source 11 emits light in the positive z-axis direction. Components 11, 200, 30, and 40 are disposed on the z-axis from the negative z-axis direction toward the positive z-axis direction.

The Dove prism 40 is rotatable with the optical axis C as its axis of rotation R. As explained in the first embodiment, the optical axis C and axis of rotation R need not coincide, but for descriptive simplicity, they will coincide in the following description. In FIG. 10, the optical axis C is parallel to the z-axis. The rotation mechanism 50 rotates the Dove prism 40. The amount of rotation of the rotation mechanism 50 is controlled by the control circuit 70. The 'amount of rotation of the rotation mechanism 50' means the amount by which the rotation mechanism 50 turns the Dove prism 40. The Dove prism 40 is an optical element.

The condenser lens 200 is a lens with optical surfaces exhibiting different power in the y-axis direction and x-axis direction. For example, the condenser lens 200 is a toroidal lens or a free-form lens. In relation to the road surface, the light distribution pattern of a motorcycle's headlight device is wide in the horizontal direction and narrow in the vertical direction on the road surface. The horizontal direction is the x-axis direction. The vertical direction is the y-axis direction. In order to correspond to the differing horizontal and vertical light distribution characteristics of the light distribution pattern, the optical surfaces of the condenser lens 200 have greater power in the y-axis direction than in the x-axis direction. As noted above, 'power' is refractive power. 'Refractive power' is the degree to which light is bent.

FIG. 11 illustrates drawings showing how light rays emitted from the center of the light emitting surface 12 are transmitted through the condenser lens 200. Here, FIG. 11(A) is a side view. FIG. 11(B) is a top view. The x-axis direction is the horizontal direction. The y-axis direction is the vertical direction.

It can be seen that, as shown in FIG. 11, the power of the optical surfaces of the condenser lens 200 is greater in the y-axis direction than in the x-axis direction. In relation to the divergence of the light from the light source 11, by increasing the curvature in the y-axis direction it is possible to greatly suppress the divergence of the light in the vertical direction. To 'greatly suppress the divergence' is to reduce the divergence by a large amount in relation to the divergence of the light from the light source 11. By reducing the curvature in the x-axis direction, it is possible to suppress the divergence in the horizontal direction a little in relation to the divergence of light from the light source 11. To 'suppress the divergence a little' is to reduce the divergence by a small amount in relation to the divergence of the light from the light source 11. 'Curvature' is a quantity indicating how curved a curved line or curved surface is. For example, the curvature of the circumference of a circle of radius r is $1/r$; the curvature increases as the curve becomes tighter.

It can be seen that, as shown in FIG. 11, the divergence angle of the light emitted from the light source 11 in the horizontal direction (x-axis direction) and vertical direction (y-axis direction) is the same. The condenser lens 200, however, makes the divergence angle in the horizontal direction (x-axis direction) greater than the divergence angle in the vertical direction (y-axis direction). The 'divergence angle' is the angle by which the light spreads. That is, the condenser lens 200 is a lens that outputs light with different divergence angles in the y-axis direction and x-axis direction.

Use of the condenser lens 200 enables a horizontally wide and vertically narrow light distribution pattern to be obtained. Increasing the positive power (refractive power) means increasing the curvature. That is, it means reducing the radius of curvature to produce greater refraction.

As shown in FIG. 11, the vehicle headlight device 110 uses the condenser lens 200 to expand the light distribution. Because of this, the light entering the Dove prism 40 is not collimated. This causes astigmatism. The astigmatism makes the bundle of light rays exiting the exit surface 403 thicker than the bundle of light rays incident on the incidence surface 401. A 'bundle of light rays' is a collection of light rays sharing a common wavefront. A 'wavefront' is a curved surface formed by considering a multitude of light rays emitted from a single point light source and linking points on these rays with equal optical path lengths from the light source.

Accordingly, the Dove prism 40 is preferably larger in size than it was in the vehicle headlight device 100 according to the first embodiment. This is because it must be large enough to accommodate an expanded light distribution. As its function, however, the Dove prism 40 only needs to be capable of turning, according to the bank angle k, by k/2 in the direction opposite the bank angle direction to correct the tilt of the light distribution. The bundle of light rays at the incidence surface 401 and the bundle of light rays at the exit surface 403 may differ in size. In the following description, a bundle of light rays is also referred to as a light beam, but the meaning is the same.

In this way, the vehicle headlight device 110 according to the second embodiment can expand the light distribution without having a projection lens 60. By rotating the Dove prism 40 around the axis of rotation R according to the bank angle k of the vehicle body the vehicle headlight device 110 can achieve its intended purpose of illuminating the area (the corner area 2004) in the direction of travel toward which the driver's gaze is directed when the vehicle body is in a tilted condition.

In addition, the structure of the rotation mechanism 50 can be made simpler in the vehicle headlight device 110 than in the vehicle headlight device 100 in the first embodiment. Specifically, gears 503 and 504 are not needed. The vehicle headlight device 110 can also reduce the load on the rotation mechanism 50. Specifically, the load of driving the projection lens 60 is eliminated. Elimination of the projection lens 60 can also eliminate the Fresnel losses that occur at the interface of the projection lens 60. This contributes to the improvement of light utilization efficiency.

The vehicle headlight device 110 according to the second embodiment does not collimate the light entering the incidence surface 401, so the size of the Dove prism 40 must be increased. Even so, the vehicle headlight device 110 can produce a greater reduction in manufacturing cost, due to mechanical simplification, and a greater reduction in size than the vehicle headlight device 100 according to the first embodiment. Major effects, such as energy saving effects, are also achieved from the improved light utilization efficiency and load reduction in the vehicle headlight device 110.

The vehicle headlight device 110 further includes a condenser lens 200 between the light source 11 and light distribution pattern forming unit 30. The divergence angle of the light beam that has passed through the condenser lens 200 is smaller in the vertical direction of the vehicle body than in the horizontal direction of the vehicle body.

Third Embodiment

The vehicle headlight device 100 according to the first embodiment provided a collimating lens 20 ahead of the light distribution pattern forming unit 30 to make collimated light incident on the light distribution pattern forming unit 30. It also rotated the Dove prism 40 and projection lens 60 according to the bank angle k of the vehicle body. The vehicle headlight device 120 according to the third embodiment employs a modified Dove prism 41 instead of the light distribution pattern forming unit 30. The vehicle headlight device 120 is also configured without a projection lens 60.

Here, components that are identical to components in the first embodiment are given the same reference characters and descriptions will be omitted. The components that are the same as in the first embodiment are a light source 11, a collimating lens 20, a rotation mechanism 50, a control circuit 70, and a vehicle tilt sensor 75. The vehicle headlight device 120 according to the third embodiment does not have a projection lens 60, so the rotation mechanism 50 lacks gears 503 and 504. The vehicle headlight device 120 may, however, be configured to include a projection lens 60.

FIG. 12 schematically shows the configuration of the vehicle headlight device 120 according to the third embodiment. Here, FIG. 12(A) is a side view of the vehicle headlight device 120. FIG. 12(B) is a top view of the vehicle headlight device 120.

To simplify the description of the drawings, the description below will use xyz coordinates. The xyz coordinates are defined in the same way as in the first embodiment. When the vehicle body is not tilted, the z-x plane is a horizontal plane. The z-axis indicates the longitudinal direction of the vehicle body. The positive z-axis direction indicates the front side of the vehicle body. The negative z-axis direction indicates the rear side of the vehicle body. The x-axis indicates the lateral direction of the vehicle body. The positive x-axis direction is to the left when facing front. The negative x-axis direction is to the right when facing front. The y-axis indicates the direction perpendicular to the z-x plane. The positive y-axis direction is the upward direction (the direction toward the sky). The negative y-axis direction is the downward direction (the direction toward the ground).

The vehicle headlight device 120 has a light source 11 and modified Dove prism 41. The vehicle headlight device 120 may also have a collimating lens 20. Components 11, 20, and 41 are disposed on the light path of the light source 11 in the order of light source 11, collimating lens 20, and modified Dove prism 41. In FIG. 12, the light source 11 emits light in the positive z-axis direction. Components 11, 20, and 41 are disposed on the z-axis from the negative z-axis direction toward the positive z-axis direction.

The modified Dove prism 41 is rotatable, with the optical axis C as its axis of rotation R. As explained in the first embodiment, the optical axis C and axis of rotation R need not coincide, but for descriptive simplicity, they will coincide in the following description. In FIG. 12, the optical axis C is parallel to the z-axis. The rotation mechanism 50 rotates the Dove prism 40. The amount of rotation of the rotation mechanism 50 is controlled by the control circuit 70. The 'amount of rotation of the rotation mechanism 50' means the amount by which the rotation mechanism 50 turns the modified Dove prism 41. The modified Dove prism 41 is an optical element.

FIG. 13 is a side view of the modified Dove prism 41. The modified Dove prism 41 is a Dove prism with a toroidal lens having negative power mated to its exit surface 413. The modified Dove prism 41 may be made in one piece. The exit surface 414 of the modified Dove prism 41 has the shape of a toroidal lens. A toroidal lens is a lens that has different power in the x-axis direction and y-axis direction. Cylindrical lenses are included here among toroidal lenses. A cylindrical lens has convergent or divergent refractive power in one direction and no refractive power in the orthogonal direction. A cylindrical lens is configured with a cylindrical surface. The curvature of the exit surface 414 in the x-axis direction corresponds to the horizontal light distribution in relation to the road surface. The curvature of the exit surface 414 in the y-axis direction corresponds to the vertical light distribution in relation to the road surface. The horizontal direction is the x-axis direction. The vertical direction is the y-axis direction.

In FIG. 13, $x_2y_2z_2$-coordinates are marked in addition to the xyz-coordinates. The $x_2y_2z_2$-coordinates are coordinates of the toroidal lens disposed on the exit surface 413 of the Dove prism. The $z_2$-axis is the reference axis of the toroidal lens. In the state in which the toroidal lens is disposed on the exit surface 413 of the Dove prism, the origin of the $x_2y_2z_2$-coordinates is on the reflecting surface 412. The $z_2$-axis is the reference axis of the toroidal lens. The $x_2$-axis is parallel to the x-axis. The $x_2$-$y_2$ plane is on the surface of the exit surface 413.

As shown in FIG. 13, the plane shape of the toroidal lens corresponds to the plane shape of a toroidal lens having an aperture twice that of the Dove prism before the toroidal lens is attached, with the unnecessary portions in the $y_2$-axis direction of the exit surface 413 (the portions shown in dashed lines in FIG. 13) removed. That is, the plane shape of the exit surface 413 is the shape of a toroidal lens cleaved at the position of the reference axis. The cleaved surface of the toroidal lens is formed so as to connect up with the reflecting surface 412. The surface of the toroidal lens extending from the reference axis ($z_2$-axis) toward the negative $y_2$-axis side is used as the exit surface 414 of the modified Dove prism 41.

The light distribution pattern of the vehicle headlight device is horizontally wide and vertically narrow in relation to the road surface. The curvature of the toroidal surface of the exit surface 414 in the $x_2$-axis direction therefore differs from the curvature in the $y_2$-axis direction. The curvature in the $x_2$-axis direction determines the horizontal light distribution in relation to the road surface. The curvature in the $y_2$-axis direction determines the vertical light distribution in relation to the road surface. The curvature in the $x_2$-axis direction forms a horizontally wide light distribution pattern in relation to the road surface. The curvature in the $y_2$-axis direction forms a vertically less widened light distribution pattern in relation to the road surface.

The negative power of the toroidal lens in a first direction (the $x_2$-axis direction) parallel to the reflecting surface 412 is greater than the negative power of the toroidal lens in a second direction (the $y_2$-axis direction) perpendicular to the first direction. That is, the curvature of the toroidal lens formed on the exit surface 413 is greater in the perpendicular direction (the $y_2$-axis direction) than in the horizontal direction (the $x_2$-axis direction). For example, the curvature of the circumference of a circle of radius r is 1/r, the curvature increasing as the curve becomes tighter. Accordingly, the curved surface is curved more tightly in the vertical direction ($y_2$-axis direction) than in the horizontal direction ($x_2$-axis direction). This enables the formation of a light distribution pattern that is wide in the $x_2$-axis direction and less widened in the $y_2$-axis direction. When the modified Dove prism 41 is not rotated, the reflecting surface 412 is parallel to the horizontal plane (the z-x plane).

Since half of the toroidal lens is utilized, on the upper side of the exit surface 414 in the $y_2$-axis direction (the side in the positive $y_2$-axis direction), the inclination of the toroidal lens surface with respect to the reference axis ($z_2$-axis) is small. On the lower side in the $y_2$-axis direction (the side on the negative $y_2$-axis direction), the inclination of the toroidal surface with respect to the reference axis ($z_2$-axis) of the toroidal lens is large. In other words, the toroidal surface has a shape such that the negative power in the second direction (the $y_2$-axis direction) decreases with increasing proximity to the reflecting surface 412.

This shape makes the lens effect smaller in the region on the upper side of the light distribution pattern (the side in the positive y-axis direction). It makes the lens effect larger in the region on the lower side of the light distribution pattern (the side in the negative y-axis direction). This causes the upper side of the light distribution pattern to have a horizontal straight line shape. It causes the lower side of the light distribution pattern to have a downwardly convex curved line shape. On the lower side of the light distribution pattern, the light distribution pattern is spread out and has a downwardly convex shape. Here, 'lens effect' means the effect of bending light.

The exit surface 414 of the modified Dove prism 41 is not limited to a toroidal surface shape; an aspherical lens or a free-form lens may be used. That is, it is only necessary for the divergence angle of the light beam exiting the exit surface 414 to be large in the horizontal direction (the x-axis direction) and small in the vertical direction (the y-axis direction). For this purpose, the cross sectional shape of the surface of the exit surface 414 of the modified Dove prism 41 may differ in the $x_2$-axis direction from the cross sectional shape in the $y_2$-axis direction. With respect to the road surface, the light distribution of the vehicle headlight device is horizontally wide and vertical narrow. Accordingly, the spread angle (divergence angle) of the light beam in the x-axis direction after exiting the exit surface 414 must be larger than the spread angle (divergence angle) of the light beam in the y-axis direction after exiting the exit surface 414. In order to realize this, the cross section of the exit surface 414 of the modified Dove prism 41 in the $x_2$-axis direction may differ in shape, for example, from the cross section in the $y_2$-axis direction. Toroidal surfaces, aspherical shapes, free-form curved surface shapes, and so on are equivalent to such surface shapes.

This function need only be exhibited by the vehicle headlight device as a whole. The optical components of the vehicle headlight device 120 are the collimating lens 20 and modified Dove prism 41. This function may be given to any one of their optical surfaces. The surface with negative power for creating the shape of the light distribution pattern is, however, preferably located on the exit surface of the modified Dove prism 41. If the surface with negative power is provided on an optical surface on the light source side of the exit surface of the Dove prism, for example, the light beam is enlarged at that optical surface, resulting in increased sizes of the subsequent optical components. Size reduction is therefore difficult.

As described above, in the vehicle headlight device 120 according to the third embodiment, a widened light distribution can be provided without providing a light distribution pattern forming unit 30 and projection lens 60. That is, the vehicle headlight device 120 can form a light distribution pattern, and enlarge and project it, without having a light distribution pattern forming unit 30 and projection lens 60. The vehicle headlight device 120 can also provide a widened light distribution without having a condenser lens 200. That is, the vehicle headlight device 120 can form a light distribution pattern, and enlarge and project it, without having a condenser lens 200. By rotating the modified Dove prism 41 around the axis of rotation R according to the bank angle k of the vehicle body, the vehicle headlight device 120 can achieve the intended purpose of illuminating the area toward which the driver's gaze is directed in the direction of travel when the vehicle body is in a tilted condition.

The vehicle headlight device 120 also makes a greater contribution to the reduction in size and improvement in light utilization efficiency of a vehicle headlight device than do the vehicle headlight devices 100, 110 according to the first embodiment and second embodiment.

Owing to the toroidal surface shape of the exit surface 414 of the modified Dove prism 41, the collimated light passing through the modified Dove prism 41 is converted to the optimal exit angles and projected ahead of the vehicle. The light output from the modified Dove prism 41 can form a desired light distribution pattern having optimal spread in the horizontal direction and vertical direction, respectively.

The exit surface 414 of the modified Dove prism 41 also functions as a projection lens. Therefore, considered only in regard to the function of the projection lens 60, when the motorcycle tilts by a bank angle k, the modified Dove prism 41 must be rotated by an angle of k in the reverse direction to the bank angle k. In this respect, it differs from the Dove prism 40, which was rotated only by an angle of k/2.

However, the bank angle k is generally about 30 degrees at most. Within this angular range, even when the toroidal lens deviates from the bank angle k by half the angle, the effect on the shape of the light distribution is small enough to be practically negligible. To 'deviate from the bank angle k by half the angle' indicates that the rotation angle is at an angle of k/2 with respect to the bank angle k. The angular difference is an angle of k/2, half the bank angle k. Accordingly, even with the vehicle headlight device 120 in the third embodiment, the modified Dove prism 41 need only be rotated by k/2, half the bank angle k.

The exit surface 414 of the modified Dove prism 41 is formed with a curved surface, and the divergence angle in a cutting plane that cuts the light beam output from the exit surface 414 in a plane parallel to the reflecting surface 412 is smaller than the divergence angle in a cutting plane that cuts the light beam output from the exit surface 414 in a plane perpendicular to the reflecting surface 412. In the embodiments, the central ray of the light beam coincides with the optical axis C. In the embodiments the central ray of the light beam also coincides with the axis of rotation R. 'In a cutting plane' is the same as in a cut section of the light beam. The exit surface 414 may have a shape in a cutting plane including the light beam and parallel to the reflecting surface 412 that differs from the shape in a cutting plane including the light beam and perpendicular to the reflecting surface 412. The plane including the light beam and perpendicular to the reflecting surface 412 may be a plane that includes the central ray of the light beam.

Because the exit surface 414 is formed with a curved surface, the negative power in a cutting plane that is perpendicular to the reflecting surface 412 and includes the central ray of the light beam decreases as the distance from the reflecting surface 412 increases. In the embodiments, the central ray of the light beam coincides with the optical axis C. In the embodiments, the central ray of the light beam also coincides with the axis of rotation R.

Fourth Embodiment

The first embodiment rotates the Dove prism 40 and projection lens 60 according to the bank angle k of the vehicle body to obtain a desired light distribution. The fourth embodiment employs a rotation mirror 80 instead of the Dove prism 40. Components that are identical to components in the first embodiment are given the same reference characters and descriptions will be omitted. The components that are the same as in the first embodiment are a light source 11, a collimating lens 20, a light distribution pattern forming unit 30, a projection lens 60, a rotation mechanism 50, a control circuit 70, and a vehicle tilt sensor 75. Gear 502 of the rotation mechanism 50 is mounted on the axis of rotation 805 of the rotation mirror 80.

Figure 14A:
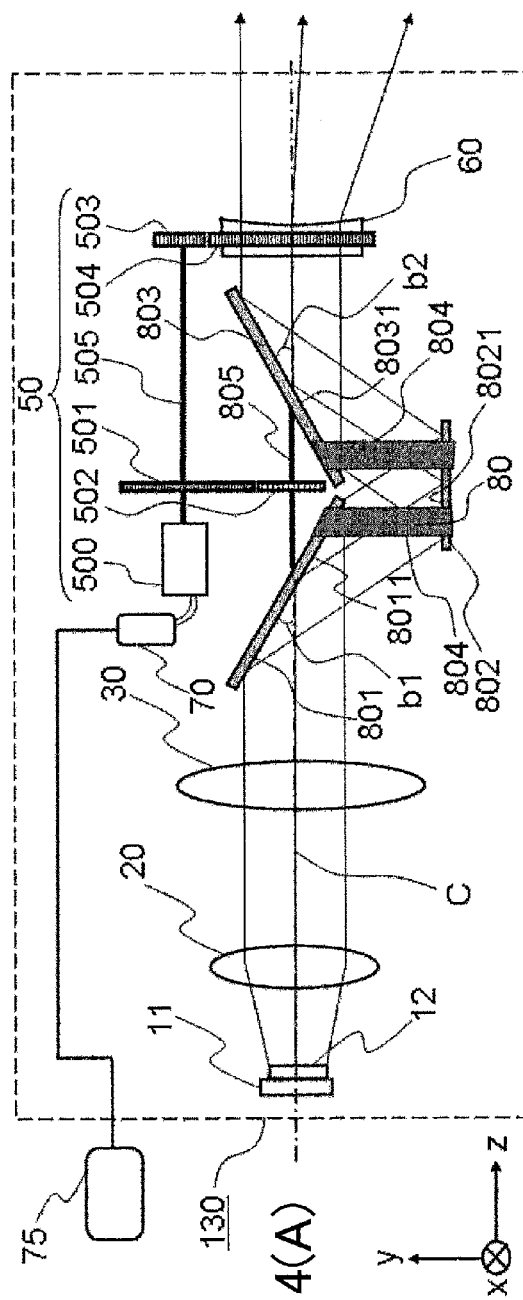
FIGS. 14(A) and 14(B) illustrate drawings showing a vehicle headlight device according to a fourth embodiment of this invention.
Figure 14B:
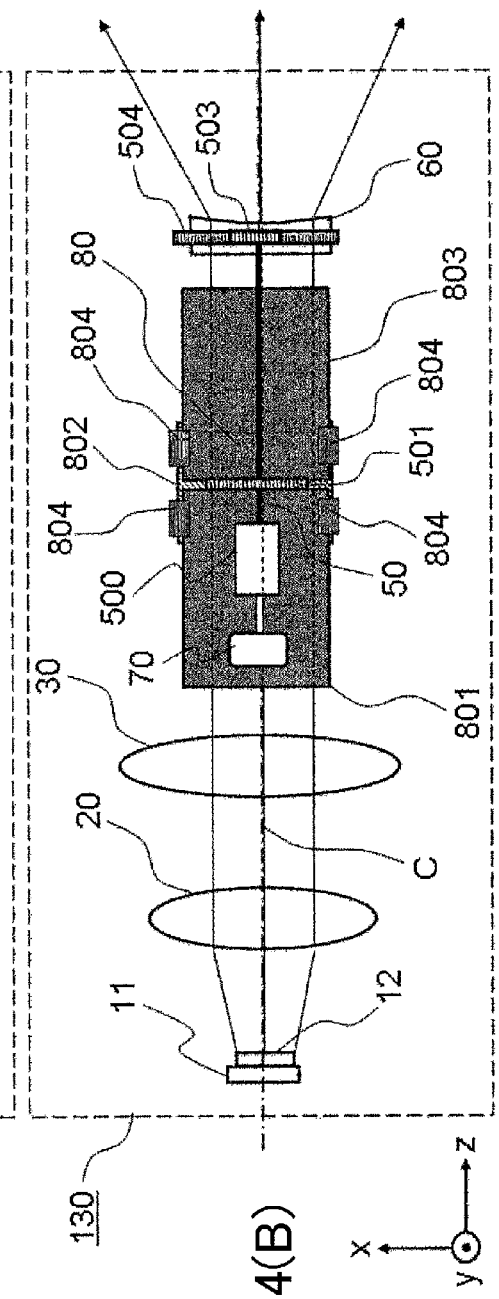

FIG. 14 schematically shows the configuration of the vehicle headlight device 130 according to the fourth embodiment. Here, FIG. 14(A) is a side view of the vehicle headlight device 130; FIG. 14(B) is a top view of the vehicle headlight device 130. FIG. 15 is a perspective view of the rotation mirror 80.

To simplify the description of the drawings, the description below will use xyz coordinates. The xyz coordinates are defined in the same way as in the first embodiment. When the vehicle body is not tilted, the z-x plane is a horizontal plane. The z-axis indicates the longitudinal direction of the vehicle body. The positive z-axis direction indicates the front side of the vehicle body. The negative z-axis direction indicates the rear side of the vehicle body. The x-axis indicates the lateral direction of the vehicle body. The positive x-axis direction is to the left when facing front. The negative x-axis direction is to the right when facing front. The y-axis indicates the direction perpendicular to the z-x plane. The positive y-axis direction is the upward direction (the direction toward the sky). The negative y-axis direction is the downward direction (the direction toward the ground).

On the light path in the z-axis direction, the vehicle headlight device 130 has a light source 11, collimating lens 20, light distribution pattern forming unit 30, rotation mirror 80, and projection lens 60. The light source 11 emits light in the positive z-axis direction. The components on the light path are the light source 11, collimating lens 20, light distribution pattern forming unit 30, rotation mirror 80, and projection lens 60, disposed in this order in the positive z-axis direction.

The rotation mirror 80 is rotatable, with the optical axis C as its axis of rotation 805. As explained in the first embodiment, the optical axis C and axis of rotation 805 need not coincide, but for descriptive simplicity, they will coincide in the following description. The projection lens 60 is rotatable about the optical axis C. The optical axis C is parallel to the z-axis. The rotation mechanism 50 exerts rotational force on the rotation mirror 80 and projection lens 60. As described above, the rotation mechanism 50 has, for example, a stepping motor 500, gears 501, 502, 503, 504, and an axle 505. The amount of rotation of the rotation mechanism 50 is controlled by the control circuit 70.

The rotation mirror 80 includes mirrors 801, 802, 803, couplers 804, and the axis of rotation 805. Mirror 801 has a mirror surface 8011. The mirror surface 8011 faces toward the negative y-axis direction and negative z-axis direction. The light source 11 emits light in the positive z-axis direction. The light emitted from the light emitting surface 12 of the light source 11 passes through the collimating lens 20 and light distribution pattern forming unit 30 and is reflected by the mirror surface 8011 of mirror 801. The light reflected by the mirror surface 8011 propagates in the negative y-axis direction and also in the positive z-axis direction.

Mirror 802 has a mirror surface 8021. Mirror surface 8021 faces in the positive y-axis direction. Mirror surface 8021 is parallel to the z-x plane. Mirror 802 reflects the light reflected by mirror 801 at its mirror surface 8021. The light reflected by mirror surface 8021 propagates in the positive y-axis direction and positive z-axis direction.

Mirror 803 has a mirror surface 8031. Mirror surface 8031 faces toward the negative y-axis direction and positive z-axis direction. Mirror 803 reflects the light reflected by mirror 802 at its mirror surface 8031. The light reflected by mirror surface 8031 propagates in the positive z-axis direction. The light reflected by mirror surface 8031 enters the projection lens 60.

The couplers 804 couple mirror 801, mirror 802, and mirror 803. The axis of rotation 805 is mounted parallel to the optical axis C. Gear 502 is mounted on the axis of rotation 805. Gear 502 receives rotational force from the stepping motor 500 via gear 501. The rotation mirror 80 is an optical element.

Angle b1 is the angle formed by the mirror surface 8011 of mirror 801 and the optical axis C (the axis parallel to the z-axis). That is, the optical axis C of the light output from the light distribution pattern forming unit 30 is inclined to the mirror surface 8011 by angle b1. Angle b1 is also the angle formed by the mirror surface 8011 of mirror 801 and the z-x plane. That is, mirror surface 8011 is inclined by angle b1 to mirror surface 8021.

Angle b2 is the angle formed by the mirror surface 8031 of mirror 803 and the optical axis C (the axis parallel to the z-axis). That is, the optical axis C of the light incident on the projection lens 60 is inclined to mirror surface 8031 by angle b2. Angle b2 is also the angle formed by the mirror surface 8031 of mirror 803 and the z-x plane. That is, mirror surface 8031 is inclined by angle b2 to mirror surface 8021.

Angle b1 is preferably of the same size as angle b2.

Mirror 802 is disposed parallel to the z-x plane. That is, mirror 802 is parallel to the z-x plane. The couplers 804 maintain the geometric positional relationships among mirror 801, mirror 802, and mirror 803. 'Geometric positional relationships' means structural positional relationships, as distinguished from optical positional relationships. Accordingly, mirror 801, mirror 802, mirror 803, and the couplers 804 need not be separate components. For example, mirror 801, mirror 802, mirror 803, and the couplers 804 may be formed in one piece.

Figure 16:
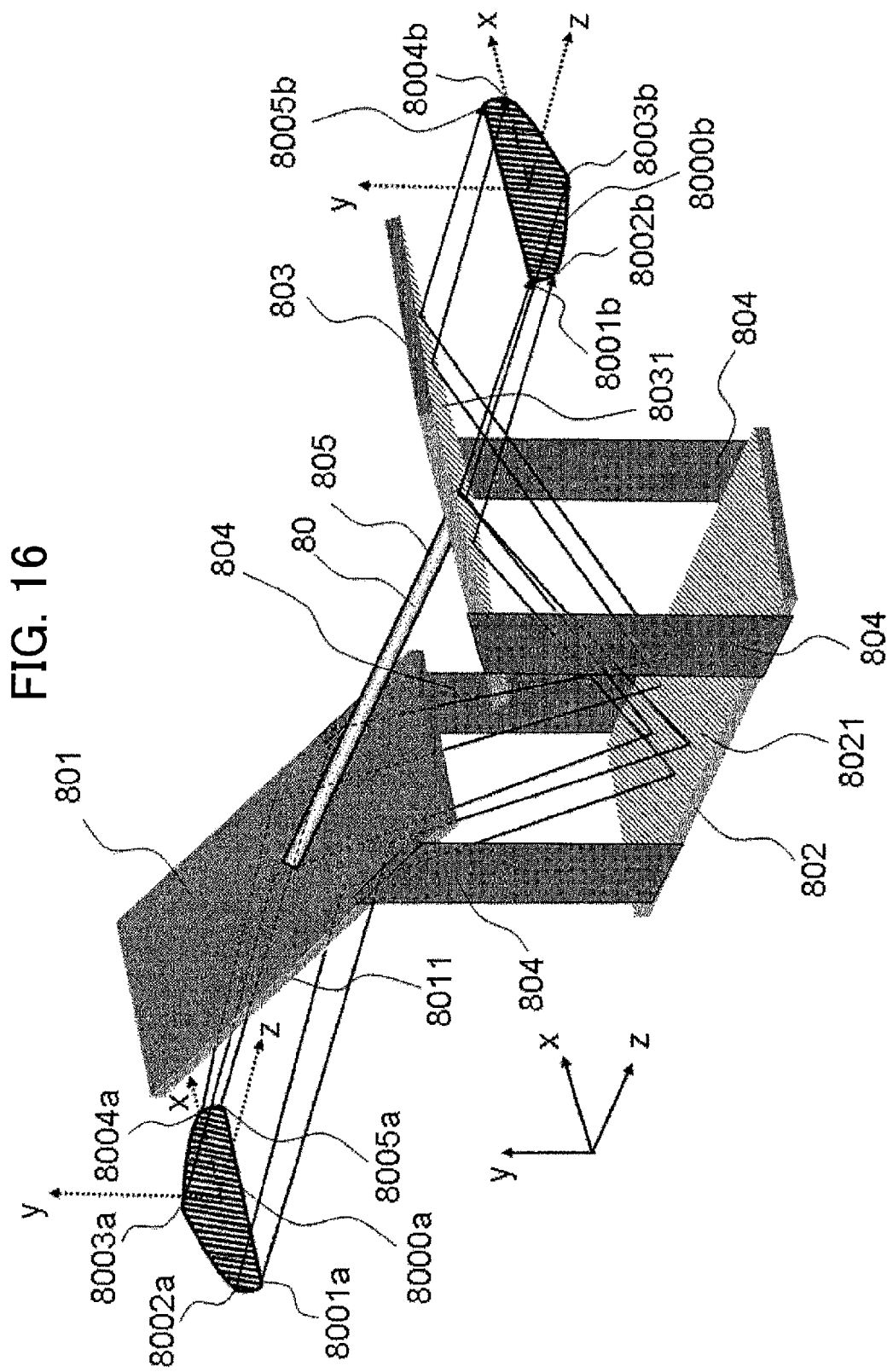
FIG. 16 is a drawing showing the shift in the light distribution pattern when the rotation mirror is not rotated.

The rotation mirror 80 has functions equivalent to those of the Dove prism 40 shown in the first embodiment. FIG. 16 is a schematic drawing showing the shift in the light distribution pattern 8000a when the rotation mirror 80 is not rotated. The 'shift' here means the change that occurs when the light distribution pattern 8000a is reflected by the mirror surfaces 8011, 8021, 8031.

Positions 8001a, 80002a, 8003a, 8004a, and 8005a indicate prescribed positions in the patterned light 8000a before it encounters the rotation mirror 80. Positions 8001b, 8002b, 8003b, 8004b, and 8005b indicate prescribed positions in patterned light 8000b that has exited the rotation mirror 80. The xyz-coordinates indicated in FIG. 14 are shown at the positions of patterned light 8000a and 8000b in FIGS. 16 and 17. The xyz-coordinates are represented by finely dashed lines.

The patterned light that has passed through position 8001a and entered the rotation mirror 80 is repeatedly reflected by, in sequence, the mirror surface 8011 of mirror 801, the mirror surface 8021 of mirror 802, and the mirror surface 8031 of mirror 803, and then exits the rotation mirror 80 and reaches position 8001*b*.

Similarly, the patterned light that has passed through position 8002*a* and entered the rotation mirror 80 is repeatedly reflected by, in sequence, the mirror surface 8011 of mirror 801, the mirror surface 8021 of mirror 802, and the mirror surface 8031 of mirror 803, and then exits the rotation mirror 80 and reaches position 8002*b*.

The patterned light that has passed through position 8003*a* and entered the rotation mirror 80 is repeatedly reflected by, in sequence, the mirror surface 8011 of mirror 801, the mirror surface 8021 of mirror 802, and the mirror surface 8031 of mirror 803, and then exits the rotation mirror 80 and reaches position 8003*b*.

The patterned light that has passed through position 8004*a* and entered the rotation mirror 80 is repeatedly reflected by, in sequence, the mirror surface 8011 of mirror 801, the mirror surface 8021 of mirror 802, and the mirror surface 8031 of mirror 803, and then exits the rotation mirror 80 and reaches position 8004*b*.

The patterned light that has passed through position 8005*a* and entered the rotation mirror 80 is repeatedly reflected by, in sequence, the mirror surface 8011 of mirror 801, the mirror surface 8021 of mirror 802, and the mirror surface 8031 of mirror 803, and then exits the rotation mirror 80 and reaches position 8005*b*.

When the mirror surface 8021 of mirror 802 is positioned parallel to the z-x plane in this way, the shape of the light distribution pattern in the x-y plane on the incidence side of the rotation mirror 80 is reversed in the vertical direction in the x-y plane on the exit side. The 'vertical direction' here is the y-axis direction.

Figure 17:
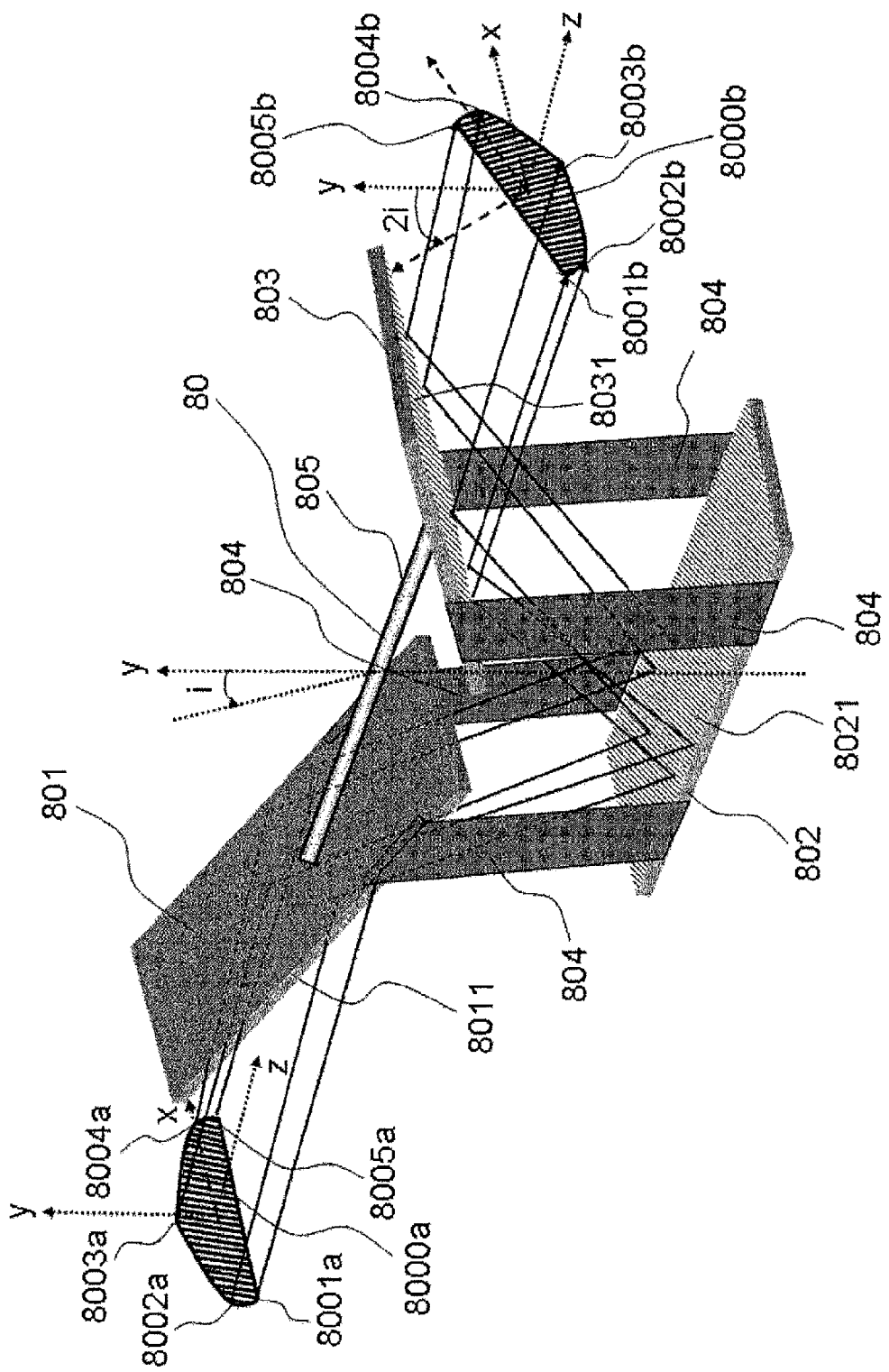
FIG. 17 is a drawing showing the shift in the light distribution pattern when the rotation mirror is rotated.

FIG. 17 is a schematic diagram showing the shift in the distribution pattern when the rotation mirror 80 is rotated by a rotational amount i with the optical axis C as the axis of rotation 805. As in FIG. 16, the patterned light that has passed through position 8001*a*, position 8002*a*, position 8003*a*, position 8004*a*, and position 8005*a* in the patterned light 8000*a* and entered the rotation mirror 80 is repeatedly reflected, in sequence, by the mirror surface 8011 of mirror 801, the mirror surface 8021 of mirror 802, and the mirror surface 8031 of mirror 803, respectively, and then exits the rotation mirror 80 and reaches the corresponding position 8001*b*, position 8002*b*, position 8003*b*, position 8004*b*, and position 8005*b* in the patterned light 8000*b*.

FIG. 17 shows the case when the rotation mirror 80 rotates clockwise looking from the negative z-axis direction toward the positive z-axis direction by a rotational angle i. FIG. 17 shows the rotated x-axis and y-axis by coarsely dashed lines. The y-axis and the rotational angle i of the rotation mirror 80 are shown at the position of the axis of rotation 805.

When the rotation mirror 80 is rotated by a rotational amount i in this way, with the optical axis C as the axis of rotation 805, the shape of the light distribution pattern on the x-y plane on the incidence side of the rotation mirror 80 changes further from a shape of a light distribution pattern that is vertically reversed on the x-y plane on the exit side to a shape rotated by a rotational angle of 2i around the optical axis C as the axis of rotation 805. The direction of rotation of the shape of the light distribution pattern on the exit side is the same as the direction of rotation of the rotation mirror 80. Looking from the negative z-axis direction toward the positive z-axis direction, the patterned light 8000*b* shown in FIG. 17 is rotated clockwise by an angle of 2i with respect to the patterned light 8000*b* shown in FIG. 16.

Thus the rotation mirror 80 has the same function as the Dove prism 40 in the first embodiment. The rotation mirror 80 can therefore be used to obtain the same effects as in the first embodiment. The rotation mirror 80 is also easier to manufacture than the Dove prism 40 in the first embodiment. The rotation mirror 80 is thus lower in cost than the Dove prism 40 in the first embodiment. Since the rotation mirror 80 can have a built-in axis of rotation 805, in comparison with the Dove prism 40 in the first embodiment, the rotation mechanism 50 can be simplified.

The vehicle headlight device 130 has a light source 11, rotation mirror (optical element) 80, and rotation mechanism 50. The light source 11 emits light. The rotation mirror (optical element) 80 changes the direction of travel of the light incident on its incidence surface 8011 (mirror surface) and guides it to a reflecting surface 8021 (mirror surface), then changes the direction of travel of the light reflected by the reflecting surface 8021 (mirror surface) at the exit surface 8031 (mirror surface), and outputs the light. The rotation mechanism 50 rotatably supports the rotation mirror (optical element) 80 with a line passing through the incidence surface 8011 (mirror surface) and exit surface 8031 (mirror surface) as the axis of rotation 805, and rotates the rotation mirror (optical element) 80 according to the bank angle k of the vehicle body, in the direction opposite to the bank direction of the vehicle body.

The axis of rotation 805 is a line parallel to the reflecting surface 8021 (mirror surface) and perpendicular to the line of intersection of the incidence surface 8011 (mirror surface) with a plane parallel to the reflecting surface 8021 (mirror surface). In the fourth embodiment, it is a line parallel to the z-axis. The axis of rotation 805 can be a line passing through the center position of the incidence surface 8011 (mirror surface). The axis of rotation 805 can also be made to coincide, on the incidence surface 8011, with the central ray of the light beam incident on the incidence surface 8011 (mirror surface).

The rotation mirror (optical element) 80 is furnished with a first mirror 801 having a first mirror surface 8011 corresponding to the incidence surface 401 of the Dove prism 40, a second mirror 803 having a second mirror surface 8031 corresponding to the exit surface 403 of the Dove prism 40, and a third mirror 802 having a third mirror surface 8021 corresponding to the reflecting surface 402 of the Dove prism 40. The first mirror 801 and second mirror 803 are arranged with their rear sides facing each other and are disposed on the third mirror surface 8021 side of the third mirror 802. The angle b1 formed by the first mirror surface 8011 of the first mirror 801 and the third mirror surface 8021 of the third mirror 802 and the angle b2 formed by the second mirror surface 8031 of the second mirror 803 and the third mirror surface 8021 of the third mirror 802 are acute angles.

The rotation mechanism 50 rotates the rotation mirror (optical element) 80 by a rotational amount equal to half the bank angle k.

The vehicle headlight device 130 further includes a projection lens 60 for expanding the light exiting the rotation mirror (optical element) 80 and outputting the expanded light. The rotation mechanism 50 rotatably supports the projection lens 60, with the optical axis C as the axis of rotation, and rotates the projection lens 60 in the direction opposite to the bank direction k of the vehicle body. The amount of rotation of the projection lens 60 is the same as the bank angle k.

The vehicle headlight device 130 further includes a light distribution pattern forming unit 30. From the light emitted from the light source 11, the light distribution pattern forming unit 30 forms and outputs patterned light 8000a having a prescribed light distribution pattern.

The vehicle headlight device 130 further includes a collimating lens 20. The collimating lens 20 receives and collimates incident light emitted from the light source 11 and outputs the collimated light toward the light distribution pattern forming unit 30.

Fifth Embodiment

The fifth embodiment has a configuration in which the rotation mirror 80 shown in the fourth embodiment takes the place of the Dove prism 40 in the second embodiment. Components that are the same as components in the second embodiment are given identical reference characters and descriptions will be omitted. The components that are the same in the second embodiment are a light source 11, a condenser lens 200, a light distribution pattern forming unit 30, a rotation mechanism 50, a control circuit 70, and a vehicle tilt sensor 75. Gear 502 of the rotation mechanism 50 is mounted on the axis of rotation 805 of the rotation mirror 80.

FIG. 18 illustrates drawings schematically showing the configuration of the vehicle headlight device 140 according to the fifth embodiment. Here, FIG. 18(A) is a side view of the vehicle headlight device 140; FIG. 18(B) is a top view of the vehicle headlight device 140.

To simplify the description of the drawings, the description below will use xyz coordinates. The xyz coordinates are defined in the same way as in the first embodiment. When the vehicle body is not tilted, the z-x plane is a horizontal plane. The z-axis indicates the longitudinal direction of the vehicle body. The positive z-axis direction indicates the front side of the vehicle body. The negative z-axis direction indicates the rear side of the vehicle body. The x-axis indicates the lateral direction of the vehicle body. The positive x-axis direction is to the left when facing front. The negative x-axis direction is to the right when facing front. The y-axis indicates the direction perpendicular to the z-x plane. The positive y-axis direction is the upward direction (the direction toward the sky). The negative y-axis direction is the downward direction (the direction toward the ground).

On the light path in the z-axis direction, the vehicle headlight device 140 has a light source 11, condenser lens 200, light distribution pattern forming unit 30, and rotation mirror 80. The light source 11 emits light in the positive z-axis direction. The components on the light path are the light source 11, condenser lens 200, light distribution pattern forming unit 30, and rotation mirror 80, disposed in this order in the positive z-axis direction.

The rotation mirror 80 is rotatable, with the optical axis C as the axis of rotation 805. As explained in the first embodiment, the optical axis C and axis of rotation 805 need not coincide, but for descriptive simplicity, they will coincide in the following description. The optical axis C is parallel to the z-axis. The rotation mechanism 50 exerts rotational force on the rotation mirror 80. As described above, the rotation mechanism 50 has, for example, a stepping motor 500, gears 501, 502, 503, 504, and an axle 505. The amount of rotation of the rotation mechanism 50 is controlled by the control circuit 70. The rotation mirror 80 is an optical element.

The rotation mirror 80 has mirrors 801, 802, 803, couplers 804, and an axis of rotation 805. The configuration and function of the rotation mirror 80 are as described in the fourth embodiment.

The rotation mirror 80 has functions equivalent to those of the Dove prism 40 in the second embodiment. The vehicle headlight device 140 can therefore use the rotation mirror 80 to obtain the same effects as the vehicle headlight device 110 in the second embodiment. The rotation mirror 80 can be manufactured more easily and at a lower cost than the Dove prism 40 in the second embodiment. In addition, since the rotation mirror 80 can have a built-in axis of rotation 805, in comparison with the Dove prism 40 in the first embodiment it can simplify the rotation mechanism 50.

The vehicle headlight device 140 further has a condenser lens 200 between the light source 11 and the light distribution pattern forming unit 30. The divergence angle of the light beam transmitted through the condenser lens 200 is smaller in the vertical direction of the vehicle body than in the horizontal direction of the vehicle body.

Sixth Embodiment

The sixth embodiment employs a modified rotation mirror 81 instead of the modified Dove prism 41 in the third embodiment. Components that are identical to components in the third embodiment are given the same reference characteristics and descriptions will be omitted. The components that are the same as in the third embodiment are a light source 11, a collimating lens 20, a rotation mechanism 50, a control circuit 70, and a vehicle tilt sensor 75. Gear 502 of the rotation mechanism 50 is mounted on the axis of rotation 815 of the modified rotation mirror 81.

Figures 19A, 19B:
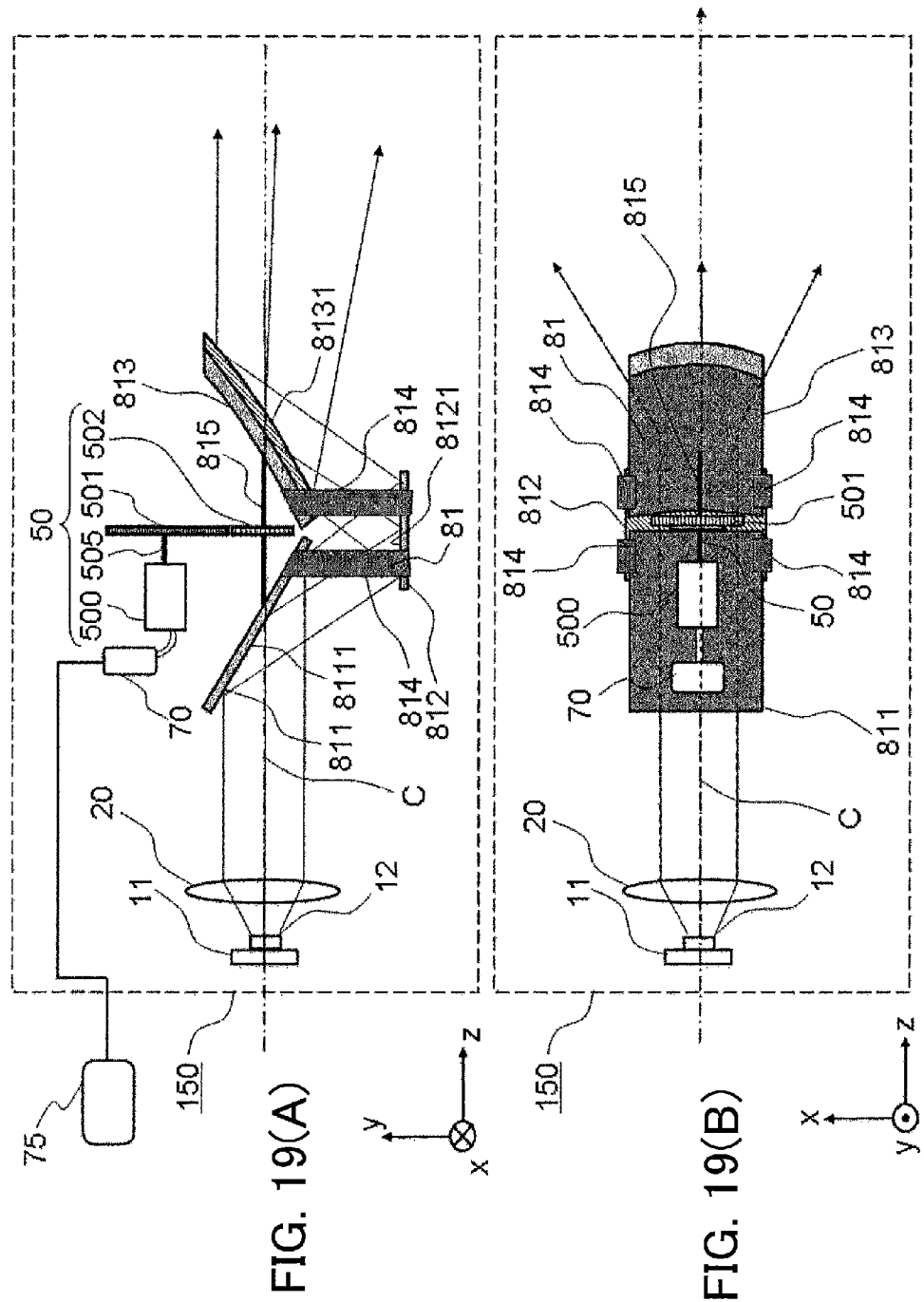
FIGS. 19(A) and 19(B) illustrate drawings showing a vehicle headlight device according to a sixth embodiment of this invention.

FIG. 19 illustrates drawings schematically showing the configuration of the vehicle headlight device 150 according to the sixth embodiment. Here, FIG. 19(A) is a side view of the vehicle headlight device 150; FIG. 19(B) is a top view of the vehicle headlight device 150.

To simplify the description of the drawings, the description below will use xyz coordinates. The xyz coordinates are defined in the same way as in the first embodiment. When the vehicle body is not tilted, the z-x plane is a horizontal plane. The z-axis indicates the longitudinal direction of the vehicle body. The positive z-axis direction indicates the front side of the vehicle body. The negative z-axis direction indicates the rear side of the vehicle body. The x-axis indicates the lateral direction of the vehicle body. The positive x-axis direction is to the left when facing front. The negative x-axis direction is to the right when facing front. The y-axis indicates the direction perpendicular to the z-x plane. The positive y-axis direction is the upward direction (the direction toward the sky). The negative y-axis direction is the downward direction (the direction toward the ground).

The vehicle headlight device 150 has a light source 11, collimating lens 20, and modified rotation mirror 81. The light source 11 emits light in the positive z-axis direction. The components on the light path are the light source 11, condenser lens 200, light distribution pattern forming unit 30, and modified rotation mirror 81, which are disposed in this order in the positive z-axis direction.

The modified rotation mirror 81 is rotatable with the optical axis C as the axis of rotation 815. As explained in the first embodiment, the optical axis C and axis of rotation 815 need not coincide, but for descriptive simplicity, the optical axis C and axis of rotation 815 will coincide in the following description. The optical axis C is parallel to the z-axis. The rotation mechanism 50 exerts rotational force on the rotation mirror 80. As described above, the rotation mechanism 50 has, for example, a stepping motor 500, gears 501, 502, and an axle 505. The amount of rotation of the rotation mechanism 50 is controlled by the control circuit 70. The modified rotation mirror 81 is an optical element.

The modified rotation mirror 81 includes mirrors 811, 812, 813, couplers 814, and the axis of rotation 815. The configuration and function of the modified rotation mirror 81 differ from the configuration and function of the rotation mirror 80 described in the fourth embodiment in that mirror 813 has a toroidal surface shape. Mirrors 811 and 812 of the modified rotation mirror 81 are thus the same as mirrors 801 and 802 of rotation mirror 80. The couplers 814 of the modified rotation mirror 81 are the same as the couplers 804 of rotation mirror 80. The axis of rotation 815 of the modified rotation mirror 81 is the same as the axis of rotation 805 of rotation mirror 80.

Figure 20:
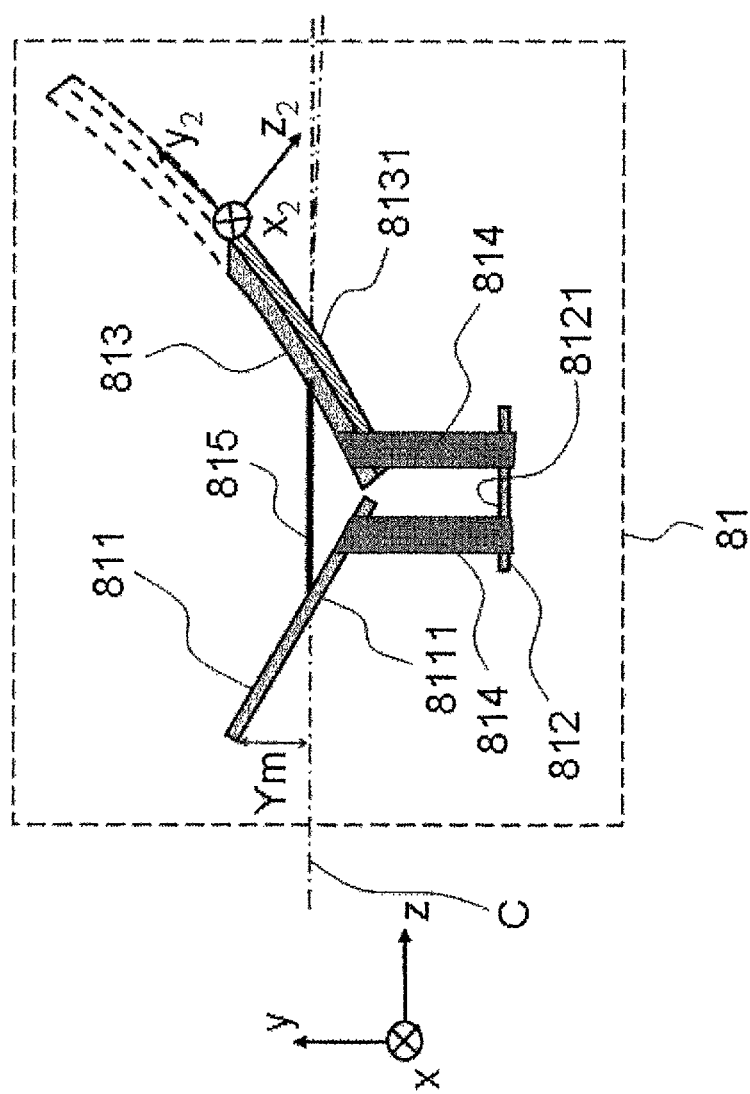
FIG. 20 is a side view of a modified rotation mirror in the vehicle headlight device according to the sixth embodiment of this invention.

FIG. 20 is a side view of the modified rotation mirror 81. The mirror surface 8131 of mirror 813 of the modified rotation mirror 81 has a toroidal surface shape. A toroidal surface shape is a surface shape that has different power in the x-axis direction and y-axis direction. Cylindrical surface shapes are included among toroidal surface shapes. A cylindrical surface is the surface of a cylinder. A cylindrical surface is a surface having curvature in one direction but no curvature in the orthogonal direction. The curvature of mirror surface 8131 in the x-axis direction corresponds to the light distribution in the horizontal direction (x-axis direction) in relation to the road surface. The curvature of mirror surface 8131 in the y-axis direction corresponds to the light distribution in the vertical direction (y-axis direction).

As shown in FIG. 20, the edge of mirror 813 in the positive y-axis direction and the edge of mirror 811 in the positive y-axis are at the same height. That is, if the height distance in the y-axis direction from the optical axis C to the edge of the mirror 811 is Yin in the positive y-axis direction, the edge of mirror 813 in the positive y-axis direction is positioned at a height Yin from the optical axis C.

The $x_2 y_2 z_2$-coordinates shown in FIG. 20 are the same as the $x_2 y_2 z_2$-coordinates shown in FIG. 13 in the third embodiment. The $x_2 y_2 z_2$-coordinates are coordinates on the toroidal surface of mirror surface 8131 of the modified rotation mirror 81. The $x_2 y_2 z_2$-coordinates shown in FIG. 20 are coordinates whose $z_2$-axis is perpendicular to mirror surface 8131. The $z_2$-axis is the reference axis of the toroidal surface. The $x_2$-axis indicates the tangential direction of mirror surface 8131. The $x_2$-axis is parallel to the x-axis. The $y_2$-axis indicates the tangential direction of mirror surface 8131. The $y_2$-$z_2$ plane is a plane passing through the optical axis C parallel to the y-z plane. That is, the optical axis C is in the $y_2$-$z_2$ plane. The origin of the $x_2 y_2 z_2$-coordinates is at the edge of mirror 813 in the positive y-axis direction.

In the $x_2 y_2 z_2$-coordinates located on the edge of mirror surface 8131 in the positive y-axis direction, the angle that the $y_2$-axis makes in relation to the optical axis C is equal to the angle that mirror surface 8111 makes in relation to the optical axis C. That is, the $z_2$-axis at the edge of mirror 813 in the positive y-axis direction and a line normal to mirror surface 8111 are plane symmetric with respect to the x-y plane. That is, mirror 813 is designed with the center axis of the toroidal surface shape of mirror surface 8131 as the $z_2$-axis at the edge of mirror 813 in the positive y-axis direction. Its shape comes from cutting away the portion beyond the center axis of the shape of the toroidal surface in the positive y-axis direction. The portion cut away is shown in dashed lines in FIG. 20. The disposition and cleavage of this toroidal surface are identical to the disposition and cleavage of the toroidal lens described in the third embodiment.

The light distribution pattern of the headlight device is horizontally wide in relation to the road surface and vertically narrow in relation to the road surface. That is, the light distribution pattern differs in the x-axis direction and y-axis direction. The curvature of the toroidal surface of mirror surface 8131 in the $x_2$-axis direction, which determines the light distribution in the horizontal direction (x-axis direction), therefore differs from the curvature in the $y_2$-axis direction, which determines the light distribution in the vertical direction. The curvature in the $x_2$-axis direction forms a horizontally wide light distribution pattern. The curvature in the $y_2$-axis direction forms a vertically less widened light distribution pattern.

That is, mirror surface 8131 is a curved surface with greater negative power in the $x_2$-axis direction than in the $y_2$-axis direction. Consequently, a light distribution pattern is formed that is wide in the $x_2$-axis direction and narrow in the $y_2$-axis direction. The $x_2$-axis is perpendicular to the optical axis C and parallel to mirror surface 8121 of mirror 812. The $y_2$-axis is perpendicular to the $x_2$-axis and parallel to the tangential direction of mirror surface 8131.

Mirror surface 8131 has a toroidal surface shape. The inclination of the toroidal surface of mirror surface 8131 to the z-x plane therefore increases in the negative y-axis direction.

Light emitted from the upper side (the side in the positive y-axis direction) of mirror 813 corresponds to the upper side (the side in the positive y-direction) of the illumination area of the light distribution pattern. Light emitted from the lower side (the side in the negative y-axis direction) of mirror 813 corresponds to the lower side (the side in the negative y-direction) of the illumination area of the light distribution pattern.

As described above, at the upper edge of mirror surface 8131 (the side in the positive y-axis direction), the inclination of mirror surface 8131 in the $y_2$-axis direction with respect to the optical axis C is equal to the inclination of mirror surface 8111 with respect to the optical axis C. At the upper edge of mirror surface 8131 (the side in the positive y-axis direction), the inclination of mirror surface 8131 in the $y_2$-axis direction with respect to the z-x plane is equal to the inclination of mirror surface 8111 with respect to the z-x plane. Viewed locally, therefore, it is as if a reflecting surface with curvature only in the x-axis direction were disposed at the upper edge of mirror surface 8131. Compared with the stationing of a plane mirror, accordingly, at the upper edge (the edge on the upper side), the light distribution can be widened in the x-axis direction only. This gives the upper edge of the light distribution pattern a wide straight line shape in the x-axis direction.

At the lower side (the side in the negative y-axis direction) of mirror 813, however, light rays exit in directions showing the combined effect of curvature in the $x_2$-axis direction (an effect that spreads the light distribution in the x-axis direction) and curvature in the $y_2$-axis direction (an effect that spreads the light distribution in the negative y-axis direction).

For example, the light rays exiting the $y_2$-$z_2$ plane at the lower edge of mirror 813 exit in such a way that the light distribution pattern is spread in the negative y-axis direction. This is because the effect of the curvature in the $x_2$-axis direction that spreads the light distribution in the x-axis direction does not operate in the $y_2$-$z_2$ plane. The light rays exiting the edge extending in the $x_2$-axis direction at the bottom of mirror 813 exit in directions showing the combined effect of an effect that spreads the light distribution in the x-axis direction and an effect that spreads the light distribution in the negative y-axis direction.

The lower edge of the light distribution pattern accordingly has a downwardly convex curved light distribution shape in which the light distribution is spread in the negative y-axis direction most greatly at the center in the x-axis direction. That is, the vehicle headlight device 150 according to the sixth embodiment enables the upper side of the light distribution pattern to have a horizontally wide straight line shape and the lower side of the light distribution pattern to have a downwardly convex curved shape.

The exit surface (mirror surface 8131) of the modified rotation mirror 81 is not limited to a mirror with a toroidal surface shape; a mirror with an aspherical shape or a free-form shape may be used. That is, it is only necessary for the divergence angle of the light beam leaving the exit surface (mirror surface 8131) to be large in the horizontal direction (the x-axis direction) and small in the vertical direction (the y-axis direction). For this purpose, the cross sectional surface shape of the exit surface (mirror surface 8131) of the modified rotation mirror may differ in the $x_2$-axis direction from its cross sectional surface shape in the $y_2$-axis direction. In relation to the road surface, the light distribution of the vehicle headlight device is horizontally wide and vertical narrow. That is, the spread angle (divergence angle) of the light beam in the x-axis direction after reflection from mirror surface 8131 must be larger than the spread angle (divergence angle) of the light beam in the y-axis direction after exiting the exit surface 8131. In order to accomplish this, the cross section of the exit surface (mirror surface 8131) of the modified rotation mirror in the $x_2$-axis direction, for example, may differ in shape from the cross section in the $y_2$-axis direction. Toroidal surfaces, aspherical shapes, free-form shapes, and so on are equivalent to such surface shapes.

This function need only be exhibited by the vehicle headlight device as a whole. The optical components of the vehicle headlight device 150 are the collimating lens 20 and modified rotation mirror 81. This function may be given to any one of their optical surfaces. The surface with negative power for creating the shape of the light distribution pattern is, however, preferably located on the exit surface of the modified rotation mirror 81. If the surface having negative power is provided on an optical surface on the light source side of the exit surface of the modified rotation mirror, for example, the light beam is enlarged at that optical surface, resulting in increased sizes of the subsequent optical components. Size reduction is therefore difficult.

The vehicle headlight device 150 according to the sixth embodiment thus provides a modified rotation mirror 81 instead of the modified Dove prism 41 in the third embodiment. By rotating the modified rotation mirror 81 according to the bank angle k of the vehicle body with the optical axis C as the axis of rotation 815, the vehicle headlight device 150 can achieve its intended purpose of illuminating the area toward which the driver's gaze is directed in the direction of travel when the vehicle body is in a tilted condition.

In addition, the modified rotation mirror 81 is easier to manufacture and lower in cost than the modified Dove prism 41 in the third embodiment. Since the modified rotation mirror 81 can have a built-in axis of rotation 815, in comparison with the third embodiment the rotation mechanism 50 can be simplified. Since it has functions equivalent to those of the modified Dove prism 41 in the third embodiment, the modified rotation mirror 81 can be used to obtain the same effects as in the third embodiment.

The exit surface 8131 (mirror surface) of the modified rotation mirror 81 is formed with a curved surface, and the divergence angle in a cutting plane that cuts the light beam output from the exit surface 8131 (mirror surface) in a plane parallel to the reflecting surface 8121 (mirror surface) is smaller than the divergence angle in a cutting plane that cuts the light beam output from the exit surface 8131 (mirror surface) in a plane that is perpendicular to the reflecting surface 8121 (mirror surface) and includes the central ray of the light beam. In the embodiments, the central ray of the light beam coincides with the optical axis C. In the embodiments, the central ray of the light beam also coincides with the axis of rotation R. 'In a cutting plane' is the same as in a cut section of the light beam. The exit surface 8131 (mirror surface) may have a shape in a cutting plane including the light beam and parallel to the reflecting surface 8121 (mirror surface) that differs from the shape in a cutting plane including the light beam and perpendicular to the reflecting surface 8121 (mirror surface). The plane including the light beam and perpendicular to the reflecting surface 8121 (mirror surface) may be a plane that includes the central ray of the light beam.

Because the exit surface 8131 (mirror surface) is formed as a curved surface, its negative power in a cutting plane that is perpendicular to the reflecting surface 8121 (mirror surface) and includes the central ray of the light beam decreases as the distance from the reflecting surface 8121 (mirror surface) increases. In the embodiments, the central ray of the light beam coincides with the optical axis C. In the embodiments, the central ray of the light beam also coincides with the axis of rotation R.

The vehicle equipped with the vehicle headlight device according to the foregoing embodiments is not limited to a motorcycle. The device may be used in a three wheeled motor scooter, for example. One example is the three wheeled motor scooter called the Gyro. The 'three wheeled motor scooter called the Gyro' is a scooter having three wheels: one front wheel, and two rear wheels on one axle. In Japan, this is a type of moped. It has an axis of rotation near the center of the vehicle body and almost all of the vehicle body, including the front wheel and driver's seat, can tilt in the lateral direction. This mechanism enables the center of gravity to shift inward during cornering, as in a motorcycle. Applications in four wheeled automobiles are also possible. The body of a four wheeled automobile tilts to the right when cornering to the left. It tilts to the left when cornering to the right. This is due to centrifugal force. In this regard, the bank direction is opposite to the direction in a motorcycle. It is also possible, however, to detect the bank angle of the vehicle body of a four-wheel automobile and then modify the illuminated area 2003. In a four-wheel automobile equipped with the vehicle headlight device according to the present invention, even when the vehicle body tilts because, say, a wheel on just one side rides up on an obstacle or the like, it is still possible to obtain the same illuminated area 2003 as when the vehicle body is not tilted.

Embodiments of the present invention have been described above, but the present invention is not limited to these embodiments.

REFERENCE CHARACTERS

100, 110, 120, 130, 140, 150 vehicle headlight device; light source; 12 light emitting surface; 20 collimating lens; 200 condenser lens; 2001 road edge; 2002 center line; 2003 illuminated area; 2004 corner area; 30 light distribution pattern forming unit; 40 Dove prism; 41 modified Dove prism; 401 incidence surface; 402, 412 reflecting surface; 403, 413, 414 exit surface; 4000a, 4000b, 8000a, 8000b patterned light; 4001a, 4002a, 4003a, 4004a, 4005a, 4001b, 4002b, 4003b, 4004b, 4005b position; 50 rotation mechanism; 500 stepping motor; 501, 502, 503, 504 gear; 505 axle; 60 projection lens; 70 control circuit; 75 vehicle tilt sensor; 80 rotation mirror; 81 modified rotation mirror; 801, 802, 803 mirror; 811, 812, 813 mirror; 8000a, 8000b patterned light; 8011, 8021, 8031, 8111, 8121, 8131 mirror surface; 8001a, 8002a, 8003a, 8004a, 8005a, 8001b, 8002b, 8003b, 8004b, 8005b position; 804, 814 coupler; 805, 815 axis of rotation; C optical axis; k bank angle; a1, a2, b1, b2 angle; i rotational angle; R axis of rotation; H-H horizontal line; V-V vertical line.

What is claimed is:

1. A vehicle headlight device to be mounted in a vehicle, comprising:
   a light source for emitting light;
   a Dove prism for receiving the light at an incidence surface, changing a propagation direction of the light to bring the light to a reflecting surface, reflecting the light at the reflecting surface, and changing a propagation direction of the reflected light at an exit surface from which the light exits; and
   a rotation mechanism for rotatably supporting the Dove prism with a line passing through the incidence surface and the exit surface as an axis of rotation,
   wherein the Dove prism receives a patterned light having a light distribution pattern through the incidence surface and projects the patterned light.

2. The vehicle headlight device of claim 1, wherein the rotation mechanism rotates the Dove prism according to a bank angle of a vehicle body.

3. The vehicle headlight device of claim 2, wherein the rotation mechanism rotates the Dove prism in a direction opposite to a bank direction of the vehicle body.

4. The vehicle headlight device of claim 3, wherein the rotation mechanism rotates the Dove prism by a rotation amount equal to half of the bank angle.

5. The vehicle headlight device of claim 2, wherein the rotation mechanism rotates the Dove prism by a rotation amount equal to half of the bank angle.

6. The vehicle headlight device of claim 1, wherein the axis of rotation is a line parallel to the reflecting surface and perpendicular to a line at which the incidence surface intersects a plane parallel to the reflecting surface.

7. A vehicle headlight device comprising:
   a light source for emitting light;
   an optical element for receiving the light at an incidence surface, changing a propagation direction of the light to bring the light to a reflecting surface, reflecting the light at the reflecting surface, and changing a propagation direction of the reflected light at an exit surface from which the light exits; and
   a rotation mechanism for rotatably supporting the optical element with a line passing through the incidence surface and the exit surface as an axis of rotation,
   wherein the optical element is a rotation mirror including a first mirror having a first mirror surface, the first mirror surface being the incidence surface, a second mirror having a second mirror surface, the second mirror surface being the exit surface, and a third mirror having a third mirror surface, the third mirror surface being the reflecting surface;
   the first mirror and the second mirror are positioned back to back and are disposed on a side of the third mirror surface of the third mirror; and
   the angle formed by the first mirror surface and the third mirror surface and the angle formed by the second mirror surface and the third mirror surface are acute angles.

8. The vehicle headlight device of claim 7, wherein the exit surface is formed as a curved surface, and the plane divergence angle of the light beam output from the exit surface in a cutting plane parallel to the reflecting surface is smaller than the plane divergence angle of the light beam output from the exit surface in a cutting plane perpendicular to the reflecting surface and including a central ray of the light beam.

9. The vehicle headlight device of claim 8, wherein the exit surface is formed as a curved surface, and a negative power in a cutting plane perpendicular to the reflecting surface and including the central ray of the light beam decreases with increasing distance from the reflecting surface.

10. A vehicle headlight device comprising:
    a light source for emitting light;
    an optical element for receiving the light at an incidence surface, changing a propagation direction of the light to bring the light to a reflecting surface, reflecting the light at the reflecting surface, and changing a propagation direction of the reflected light at an exit surface from which the light exits; and
    a rotation mechanism for rotatably supporting the optical element with a line passing through the incidence surface and the exit surface as an axis of rotation,
    wherein the exit surface is formed as a curved surface, and the plane divergence angle of the light beam output from the exit surface in a cutting plane parallel to the reflecting surface is smaller than the plane divergence angle of the light beam output from the exit surface in a cutting plane perpendicular to the reflecting surface and including a central ray of the light beam.

11. The vehicle headlight device of claim 10, wherein the exit surface is formed as a curved surface, and a negative power in a cutting plane perpendicular to the reflecting surface and including the central ray of the light beam decreases with increasing distance from the reflecting surface.

12. A vehicle headlight device comprising:
    a light source for emitting light;
    an optical element for receiving the light at an incidence surface, changing a propagation direction of the light to bring the light to a reflecting surface, reflecting the light at the reflecting surface, and changing a propagation direction of the reflected light at an exit surface from which the light exits; and
    a rotation mechanism for rotatably supporting the optical element with a line passing through the incidence surface and the exit surface as an axis of rotation,
    wherein the exit surface is formed as a curved surface, and a negative power in a cutting plane perpendicular to the reflecting surface and including the central ray of the light beam decreases with increasing distance from the reflecting surface.

13. The vehicle headlight device of claim 1, further comprising a toroidal lens for changing a divergence angle and forming patterned light having the light distribution pattern from the light emitted from the light source and outputting the patterned light.

14. The vehicle headlight device of claim 13, further comprising a collimating lens for receiving the light emitted from the light source, collimating the light, and outputting the light toward the toroidal lens.

15. The vehicle headlight device of claim 13, wherein:
the divergence angle of a light beam that has passed through the toroidal lens is smaller in a vertical direction of the vehicle than in a horizontal direction of the vehicle.

16. The vehicle headlight device of claim 1, further comprising a projection lens for expanding the light distribution pattern of the light output from the Dove prism and projecting the expanded light distribution pattern of the light, wherein:
the rotation mechanism rotatably supports the projection lens with the optical axis as an axis of rotation.

17. The vehicle headlight device of claim 16, wherein:
the rotation mechanism rotatably supports the projection lens with the optical axis as an axis of rotation, and rotates the projection lens in a direction opposite to the bank direction of the vehicle body.

18. The vehicle headlight device of claim 1, wherein the exit surface is formed as a curved surface, and the plane divergence angle of the light beam output from the exit surface in a cutting plane parallel to the reflecting surface is smaller than the plane divergence angle of the light beam output from the exit surface in a cutting plane perpendicular to the reflecting surface and including a central ray of the light beam.

19. The vehicle headlight device of claim 18, wherein the exit surface is formed as a curved surface, and a negative power in a cutting plane perpendicular to the reflecting surface and including the central ray of the light beam decreases with increasing distance from the reflecting surface.

20. The vehicle headlight device of claim 1, wherein the exit surface is formed as a curved surface, and a negative power in a cutting plane perpendicular to the reflecting surface and including the central ray of the light beam decreases with increasing distance from the reflecting surface.

* * * * *